(12) United States Patent
Fletcher et al.

(10) Patent No.: US 7,023,432 B2
(45) Date of Patent: Apr. 4, 2006

(54) METHODS, APPARATUS AND COMPUTER PROGRAM PRODUCTS THAT RECONSTRUCT SURFACES FROM DATA POINT SETS

(75) Inventors: G. Yates Fletcher, Cary, NC (US); Tobias Gloth, Durham, NC (US); Herbert Edelsbrunner, Chapel Hill, NC (US); Ping Fu, Chapel Hill, NC (US)

(73) Assignee: Geomagic, Inc., Durham, NC (US)

( * ) Notice: Subject to any disclaimer, the term of this patent is extended or adjusted under 35 U.S.C. 154(b) by 718 days.

(21) Appl. No.: 10/152,444

(22) Filed: May 21, 2002

(65) Prior Publication Data

US 2003/0067461 A1    Apr. 10, 2003

Related U.S. Application Data

(60) Provisional application No. 60/324,403, filed on Sep. 24, 2001.

(51) Int. Cl.
*G06T 15/00* (2006.01)

(52) U.S. Cl. .................. 345/419; 345/420; 345/423
(58) Field of Classification Search .............. 345/419, 345/420, 423, 426, 427, 428
See application file for complete search history.

(56) References Cited

U.S. PATENT DOCUMENTS

| | | | |
|---|---|---|---|
| 5,621,648 A | 4/1997 | Crump | 364/468.19 |
| 6,100,893 A | 8/2000 | Ensz et al. | 345/420 |
| 6,278,460 B1 | 8/2001 | Myers et al. | 345/420 |
| 6,374,198 B1 | 4/2002 | Schifa | 703/2 |
| 6,377,865 B1 | 4/2002 | Edelsbrunner et al. | 345/419 |
| 6,420,698 B1 | 7/2002 | Dimsdale | 250/234 |
| 6,512,993 B1 | 1/2003 | Kacyra | 702/159 |
| 6,532,299 B1 | 3/2003 | Sachdeva | 382/128 |
| 6,545,676 B1 | 4/2003 | Ryan | 345/423 |
| 6,608,913 B1 * | 8/2003 | Hinton et al. | 382/104 |
| 6,744,914 B1 * | 6/2004 | Rubbert et al. | 382/154 |
| 6,831,642 B1 * | 12/2004 | Mech | 345/420 |
| 2002/0006217 A1 | 1/2002 | Rubbert | 382/131 |
| 2002/0059042 A1 | 5/2002 | Kacyra | 702/152 |
| 2002/0114537 A1 | 8/2002 | Sutula, Jr. | 382/285 |
| 2002/0145607 A1 | 10/2002 | Dimsdale | 345/423 |

(Continued)

OTHER PUBLICATIONS

Edelsbrunner, Herbert, Geometry and Topology for Mesh Generation, Cambridge Monographs on Applied and Computational Mathematics, Cambridge University Press, ISBN 0-521-79309-2.

(Continued)

*Primary Examiner*—Phu K. Nguyen
(74) *Attorney, Agent, or Firm*—Myers Bigel Sibley & Sajovec PA

(57) ABSTRACT

Methods, apparatus and computer program products provide efficient techniques for reconstructing surfaces from data point sets. These techniques include reconstructing surfaces from sets of scanned data points that have preferably undergone preprocessing operations to improve their quality by, for example, reducing noise and removing outliers. These techniques include reconstructing a dense and locally two-dimensionally distributed 3D point set (e.g., point cloud) by merging stars in two-dimensional weighted Delaunay triangulations within estimated tangent planes. The techniques include determining a plurality of stars from a plurality of points $p_i$ in a 3D point set S that at least partially describes the 3D surface, by projecting the plurality of points $p_i$ onto planes $T_i$ that are each estimated to be tangent about a respective one of the plurality of points $p_i$. The plurality of stars are then merged into a digital model of the 3D surface.

72 Claims, 13 Drawing Sheets

Project the sets of near points, $S_1$ and $S_2$, onto the tangent planes, $T_1$ and $T_2$.

U.S. PATENT DOCUMENTS

| | | | |
|---|---|---|---|
| 2002/0158880 A1 | 10/2002 | Williams | 345/582 |
| 2002/0196954 A1 | 12/2002 | Marxen | 381/312 |
| 2003/0001835 A1 | 1/2003 | Dimsdale | 345/419 |
| 2003/0034976 A1 | 2/2003 | Raskar | 345/427 |
| 2003/0058242 A1 | 3/2003 | Redlich | 345/427 |
| 2003/0071194 A1 | 4/2003 | Mueller | 250/208.1 |
| 2003/0072011 A1 | 4/2003 | Shirley | 356/601 |
| 2003/0074174 A1 | 4/2003 | Fu | 703/13 |

OTHER PUBLICATIONS

Lodha et al., "Scattered Data Techniques for Surfaces," Proceedings of a Dagstuhl Seminar, Scientific Visualization Dagstuhl ;97, Hagen, Nielson and Post (eds.), pp. 188-222.

Zomorodian et al., "Fast Software for Box Intersections," International Journal of Computational Geometry & Applications, World Scientific Publishing Company, pp. 1-30.

Chen et al. "Surface modeling of range data by constrained triangulation," Computer Aided Design, vol. 26, No. 8, Aug. 1994, pp. 632-645.

Dey et al. "Delaunay Based Shape Reconstruction from Large Data," Proceedings IEEE 2001 Symposium on Parallel and Large-Data Visualization and Graphics, Oct. 22-23, 2001, pp. 19-27.

Edelsbrunner et al., "Three-Dimensional Alpha Shapes," ACM Transactions on Graphics, vol. 13, No. 1, Jan. 1994, pp. 43-72.

Mencl et al., "Graph-Based Surface Reconstruction Using Structures in Scattered Point Sets," Computer Graphics International, Proceedings Hannover, Germany, Jun. 22-26, 1998, pp. 298-311.

Chen et al., "Wing Representation for Rigid 3D Objects," Proceedings of the International Conference on Pattern Recognition, Atlantic City, Jun. 16-21, 1990, pp. 398-402.

International Search Report, PCT/US02/24220, May 22, 2003.

* cited by examiner

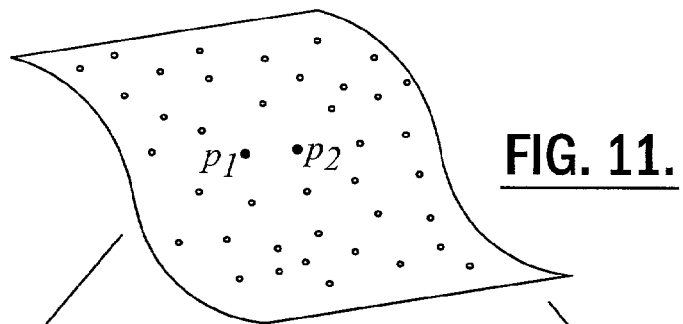
FIG. 11.
Project the sets of near points, $S_1$ and $S_2$, onto the tangent planes, $T_1$ and $T_2$.
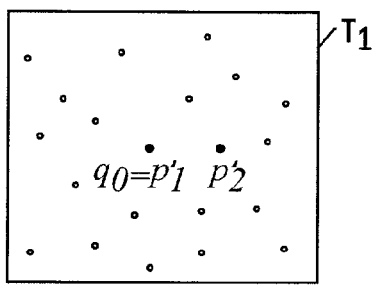 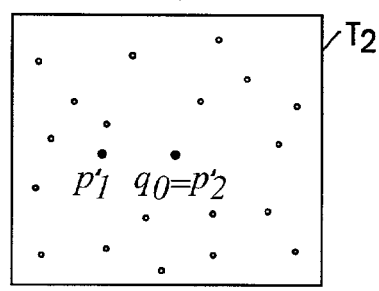
FIG. 12A.
↓ CREATE 1st TRIANGLE
↓ $q_0 q_1 q_2$
↓ CREATE 1st TRIANGLE
↓ $q_0 q_1 q_2$
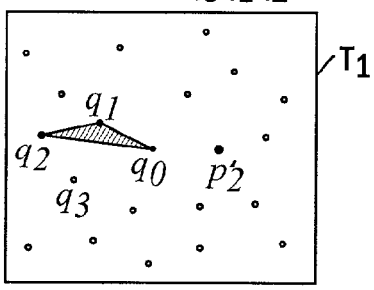 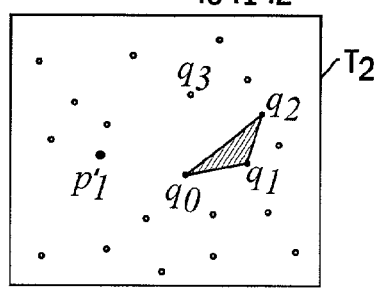
FIG. 12B.
↓ REMOVE $q_2$ AND
↓ ADD $q_0 q_1 q_3$
↓ ADD
↓ $q_0 q_2 q_3$
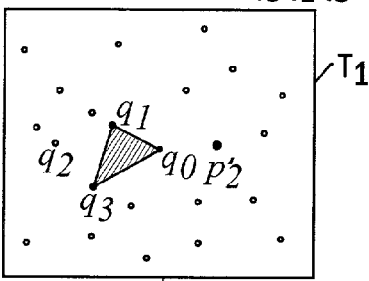 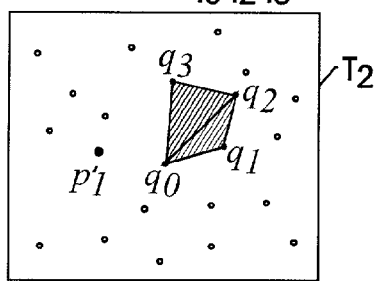
FIG. 12C.
⋮ ITERATE TO COMPLETE
⋮ STAR OF $p'_1$
⋮ ITERATE TO COMPLETE
⋮ STAR OF $p'_2$

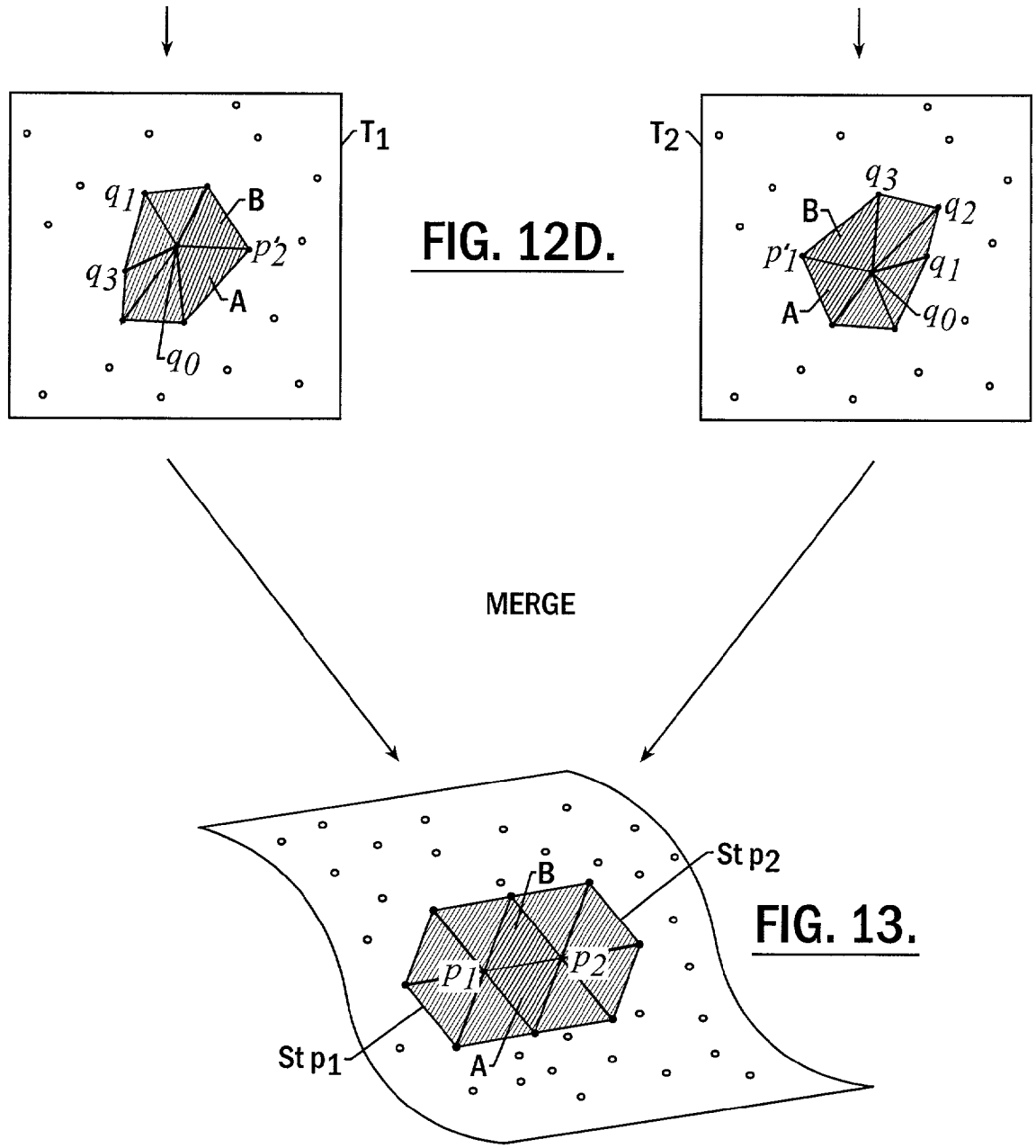

METHODS, APPARATUS AND COMPUTER PROGRAM PRODUCTS THAT RECONSTRUCT SURFACES FROM DATA POINT SETS

REFERENCE TO PRIORITY APPLICATION

This application claims priority to U.S. Provisional Application Ser. No. 60/324,403, filed Sep. 24, 2001, the disclosure of which is hereby incorporated herein by reference.

FIELD OF THE INVENTION

This invention relates to methods and systems that reconstruct three-dimensional (3D) surfaces and, more particularly, to methods and systems that reconstruct 3D surfaces from data point sets.

BACKGROUND OF THE INVENTION

Conventional techniques that use differential concepts to reconstruct surfaces from scanned data point sets typically assume a finite set of points that are sampled on the surface of a shape in a three-dimensional space and ask for an approximation of that surface. Such techniques may be classified by the assumptions they make about the data point sets. Techniques that make structural assumptions may simplify the reconstruction task by providing the points in a specific order. Techniques that make density assumptions may enable the application of differential concepts by providing sufficiently many point samples within each data point set. Techniques that avoid assumptions typically require the reconstruction operations to rely on general principles of describing geometric shapes.

One conventional technique that incorporates density assumptions is described in an article by H. Hoppe et al., entitled "Surface Reconstruction from Unorganized Points," Computer Graphics, Proceedings of SIGGRAPH, pp. 71–78 (1992). This technique uses normal estimates to generate a signed distance function from which a surface is extracted as a zero-set. Another conventional technique is described in an article by N. Amenta et al., entitled "Surface Reconstruction by Voronoi Filtering," Discrete Computer Geometry, Vol. 22, pp. 481–504 (1999). This technique exploits shape properties of three-dimensional Voronoi cells for densely sampled data points. Unfortunately, because these reconstruction techniques rely heavily on the quality of the data, they may fail if a given data point set does not adequately support the application of differential concepts. For example, these reconstruction techniques may fail if there are large gaps in the distribution of the data points in a set or if the accuracy of the data points is compromised by random noise. These techniques may also fail if the data point sets are contaminated by outliers. Data point sets having relatively large gaps, high levels of random noise and/or outliers may result from scanning objects having sharp edges and corners.

Additional surface reconstruction techniques can be distinguished based on the internal operations they perform. For example, in "sliced data" reconstruction techniques, the data points and their ordering are assumed to identify polygonal cross-sections in a finite sequence of parallel planes. This assumption may simplify the complexity of the technique, but it also typically limits the technique to data generated by a subclass of scanners. A survey of work that includes this technique is described in an article by D. Meyers et al., entitled "Surfaces from Contours," ACM Trans. on Graphics, Vol. 11, pp. 228–258 (1992). In another reconstruction technique, the data points are used to construct a map f: $\mathbb{R}^3 \rightarrow \mathbb{R}$, and the surface is constructed as the zero set, $f^{-1}(0)$. The zero set may be constructed using a marching cube algorithm that is described in an article by W. Lorensen et al., entitled "Marching Cubes: A High Resolution 3D Surface Construction Algorithm," Computer Graphics, Proceedings of SIGGRAPH, Vol. 21, pp. 163–169 (1987). One example of this reconstruction technique is described in the aforementioned article by H. Hoppe et al. Attempts to generalize and apply surface meshing techniques to the reconstruction of surfaces from unstructured data point sets have also been presented in a survey paper by S. K. Lodha and R. Franke, entitled "Scattered Data Techniques for Surfaces," Proceedings of a Dagstuhl Seminar, Scientific Visualization Dagstuhl '97, Hagen, Nielson and Post (eds.), pp. 189–230. Additional techniques for automatically wrapping data point sets into digital models of surfaces are also disclosed in U.S. Pat. No. 6,377,865 to Edelsbrunner et al., entitled "Methods of Generating Three-Dimensional Digital Models of Objects by Wrapping Point Cloud Data Points," assigned to the present assignee, the disclosure of which is hereby incorporated herein by reference.

SUMMARY OF THE INVENTION

Methods of modeling three-dimensional (3D) surfaces include preferred techniques to reconstruct surfaces from respective sets of data points that at least partially describe the surfaces. The data points may be generated as point clouds by scanning an object in three dimensions. These reconstruction techniques may include improving the quality of the reconstructed surfaces using numerical approximations of local differential structure to reduce noise and remove outliers from the data points. The numerical approximations of local differential structure may be achieved using differential concepts that include determining surface normals at respective ones of the data points. A local differential structure of a bundle of the surface normals can be used to define principal curvatures and their directions. In particular, a number of substantially non-zero principal curvatures may be used to determine the types of approximating surfaces that can be locally fit to the data points. By construction, these approximating surfaces are typically only sensitive to an average amount of noise that is locally present in the data points. Accordingly, the approximating surfaces vary considerably slower than the points themselves. This difference is preferably exploited in reducing the local variability of the data points and, therefore, the amount of random noise present therein. The same differential concepts may also be used to detect outliers and to subsample the data points in a curvature sensitive manner.

Methods of modeling 3D surfaces according to first embodiments of the present invention include determining an estimated normal for each of a plurality of points in a 3D data point set that at least partially describes the 3D surface. The plurality of points may constitute all or less than all of the points in the 3D point set. A differential structure of the estimated normals is evaluated to estimate principal curvature directions on the 3D surface and to classify a respective local neighborhood of each of the plurality of points in terms of its shape characteristic. An approximating surface is then determined for each of the local neighborhoods. A denoising operation may be performed on the 3D point set by moving each of the plurality of points to a respective approximating surface that is associated with a local neighborhood of the respective point. Other methods of modeling 3D surfaces may include operations to determine a respective set of near points $S_i$ for each of a plurality of points $p_i$ in a 3D point set S that at least partially describes the 3D surface, where $S_i \subseteq S$. An operation may then be performed to determine a normal bundle for the 3D point set S by determining a respective plane $h_i$ of best fit for each of the sets of near points $S_i$ and a respective normal $n_i$ for each of the planes $h_i$ of best fit. A respective approximating surface is then determined for each of the sets of near points $S_i$ using the normal bundle to estimate respective principal curvature directions for each of the sets of near points $S_i$.

Methods of modeling 3D surfaces according to still further embodiments of the present invention include determining a respective set of near points for each of a plurality of points in a 3D point set that at least partially describes the 3D surface and then fitting each set of near points with a respective approximating surface. The approximating surfaces may be selected from the group consisting of planes, cylinders and quadratic or cubic surfaces. The 3D point set is then denoised by moving each of the plurality of points in the 3D point set to the approximating surface associated with its respective set of near points. Additional embodiments include denoising a 3D point set that at least partially describes the 3D surface by classifying a first neighborhood of points in the 3D point set using (i) a mass distribution matrix (MDM) of the first neighborhood of points to estimate first normals associated with the first neighborhood of points and (ii) a normal distribution matrix (NDM) of the first normals to estimate principal curvature directions. Operations are then performed to fit an approximating surface to the first neighborhood of points and then move at least one point in the first neighborhood of points to the approximating surface to thereby reduce noise in the first neighborhood of points.

Additional methods of modeling three-dimensional (3D) surfaces include techniques to reconstruct surfaces from sets of scanned data points that have preferably undergone preprocessing operations to improve their quality by, for example, reducing noise and removing outliers as described above. These methods preferably include reconstructing a dense and locally two-dimensionally distributed 3D point set (e.g., point cloud) by merging stars in two-dimensional Delaunay triangulations within estimated tangent planes. These two-dimensional Delaunay triangulations may have vertices with non-zero weights and, therefore, may be described as weighted Delaunay triangulations. In particular, these methods include determining a plurality of stars from a plurality of points $p_i$ in a 3D point set S that at least partially describes the 3D surface, by projecting the plurality of points $p_i$ onto planes $T_i$ that are each estimated to be tangent about a respective one of the plurality of points $p_i$. The plurality of stars are then merged into a digital model of the 3D surface.

The operations to determine a plurality of stars preferably include identifying a respective subset of near points $S_i$ for each of the plurality of points $p_i$ and projecting a plurality of points $p_j$ in each subset of near points $S_i$ to a respective estimated tangent plane $T_i$. In particular, for each of a plurality of estimated tangent planes, $T_i$, a star of the projection of a respective point $p_i$ onto the estimated tangent plane $T_i$ is determined. The star of the projection of a respective point $p_i$ onto the estimated tangent plane $T_i$ constitutes a two-dimensional (2D) Delaunay triangulation (e.g., 2D weighted Delaunay triangulation). To improve efficiency, the operation to identify a respective subset of near points $S_i$ for each of the plurality of points $p_i$ may include storing the 3D point set S in an oct-tree. This operation may also include determining a width $2r_0$ of a near point search cube using a random sample $R \subseteq S$, where $r_0$ is a positive real number. Then, for each of the plurality of points $p_i$, a subset of $k_0$ points that are closest in Euclidean distance to $p_i$ may be determined, where $k_0$ is a positive integer. From this subset, all closest points that are also within a respective near point search cube, which is centered about a corresponding point $p_i$ and has a width equal to $2r_0$, are selected.

Additional techniques to reconstruct surfaces include modeling a three-dimensional (3D) surface by determining a plurality of stars from a plurality of points $p_i$ in a 3D point set S that at least partially describes the 3D surface, by projecting each of the plurality of points $p_i$ onto a respective plane $T_i$ that is estimated to be tangent about the corresponding point $p_i$. Weights, which are based on projection distance (e.g., (projection distance)$^2$), are also preferably assigned to each projected point so that subsequent operations to merge triangles and edges result in fewer conflicts and, therefore, fewer holes in resulting digital models. The plurality of stars are then merged into a model of the 3D surface. The merging operation includes eliminating edges and triangles from the plurality of stars that are in conflict and merging nonconflicting edges and triangles into a surface triangulation. The merging operation may include sorting triangles within the plurality of stars and removing those sorted triangles that are not in triplicate. The sorted triangles that have not been removed are then connected to define a triangulated pseudomanifold as a two-dimensional simplicial complex in which edges and triangles of a star that share a vertex form a portion of an open disk. Operations may also be performed to sort edges within the plurality of stars that do not belong to any of the triangles in the triangulated pseudomanifold and remove those sorted edges that are not in duplicate. The sorted edges that have not been removed may then be added to the triangulated pseudomanifold.

Still further methods include improving the quality of a scanned data point set by removing noise and/or eliminating outliers therefrom and/or subsampling the point set, and then reconstructing a surface from the improved data point set. These methods preferably include determining a respective set of near points $S_i$ for each of a first plurality of points $p1_i$ in a first 3D point set S1 that at least partially describes the 3D surface, where $S_i \subseteq S1$. Each set of near points $S_i$ is fit with a respective approximating surface. A denoising operation is then performed which converts the first 3D point set S1 into a second 3D point set S2. This denoising operation is performed by moving at least some of the first plurality of points $p1_i$ in the first 3D point set S1 to the approximating surfaces associated with their respective sets of near points $S_i$. Although rare, if the operation to move a point to a respective approximating surface requires a spatial translation that exceeds a designated threshold value, then the point may be removed as an outlier. A plurality of stars are then determined from a second plurality of points $p2_i$ in the second 3D point set S2. These stars are determined by projecting the second plurality of points $p2_i$ onto planes $T_i$ that are estimated to be tangent about a respective one of the second plurality of points $p2_i$. The stars are then merged into a digital model of the 3D surface.

The operations to fit each set of near points $S_i$ with a respective approximating surface comprise fitting a first set of near points $S_1$ with a first approximating surface by determining respective planes $h_j$ of best fit for each of a plurality of points $p_j$ in the first set of near points $S_1$ and then determining an estimated normal $n_j$ for each of the points $p_j$ as a normal of its respective plane $h_j$ of best fit. A shape characteristic of the first set of near points $S_1$ is also classified by determining estimates of principal curvature directions for a point $p1_i$ from a plurality of the estimated normals $n_j$. The shape characteristic may be plane-like and/or edge-like and/or corner-like.

According to still further preferred aspects of these embodiments, the operations to determine a plurality of stars include operations to determine weighted Delaunay triangulations on tangent planes. In particular, these operations may include determining a star of a first point in a 3D point set that at least partially describes the 3D surface, by: (i) projecting the first point and at least second, third and fourth points in a neighborhood of the first point in the 3D point set to a plane, (ii) assigning respective weights to each of the second, third and fourth points that are based on projection distance, and (iii) evaluating whether the projection of the fourth point is closer than orthogonal to an orthocenter of a first triangle having projections of the first, second and third points as vertices. If the projection of the fourth point is closer than orthogonal, then it is included as a vertex of a new triangle in the star of the projection of the first point and the first triangle is discarded. If the projection of the fourth point is farther than orthogonal, then it is included as a vertex of a new triangle containing the first, third and fourth points as vertices.

Additional embodiments of the present invention may also include operations to create stars of projected points by sequentially connecting a neighborhood of projected points on a plane to a first projected point on the plane by evaluating whether at least one projected point in the neighborhood of projected points is closer than orthogonal to an orthocenter of an orthocircle. This orthocircle is defined by a triangle containing the first projected point and two projected points in the neighborhood of projected points as vertices, with the neighborhood of projected points having weights associated therewith. These weights are each a function of a projection distance between a respective projected point in the neighborhood of projected points and a corresponding point in a 3D point set that at least partially describes the 3D surface.

Still further operations may include projecting a first point in a 3D point set that at least partially describes the surface and a set of points in a neighborhood of the first point to a plane that is estimated to be tangent to the surface at the first point. An operation may then be performed to create a weighted Delaunay triangulation comprising triangles that share a projection of the first point in the plane as a vertex and include at least some of the projections of the set of points in the neighborhood of the first point as vertices that are weighted as a function projection distance squared.

Embodiments of the present invention may also include operations to model a three-dimensional (3D) surface by projecting a first point in a 3D point set that at least partially describes the surface and a set of points in a neighborhood of the first point to a plane that is estimated to be tangent to the surface at the first point. Additional operations include creating a weighted Delaunay triangulation comprising triangles that share a projection of the first point in the plane as a vertex and include at least some of the projections of the set of points in the neighborhood of the first point as vertices that are weighted as a function of projection distance. Operations to create a weighted Delaunay triangulation may include operations to evaluate whether or not one or more of the projections of the set of points in the neighborhood of the first point are closer than orthogonal to an orthocenter of a first triangle in the weighted Delaunay triangulation. The operations to create a weighted Delaunay triangulation may include evaluating a 4×4 matrix containing coordinates of the vertices of the first triangle as entries therein along with entries that are functionally dependent on the weights associated with the vertices of the first triangle. These operations to evaluate the matrix may include computing a determinant of the matrix.

BRIEF DESCRIPTION OF THE DRAWINGS

FIG. 2 illustrates a standard triangle $A_1A_2A_3$ with shading that corresponds to data point sets that are strongly corner-like, edge-like and plane-like.

FIG. 11 illustrates a set of points, including $p_1$ and $p_2$, that define a portion of a three-dimensional (3D) surface.

FIGS. 12A–12D are illustrations that describe operations to create stars by sequentially connecting points projected to respective tangent planes and generate stars, according to embodiments of the present invention.

FIG. 13 illustrates a 3D triangulation that results from merging the stars illustrated by FIG. 12D.

DESCRIPTION OF A PREFERRED EMBODIMENT

Figure 1:
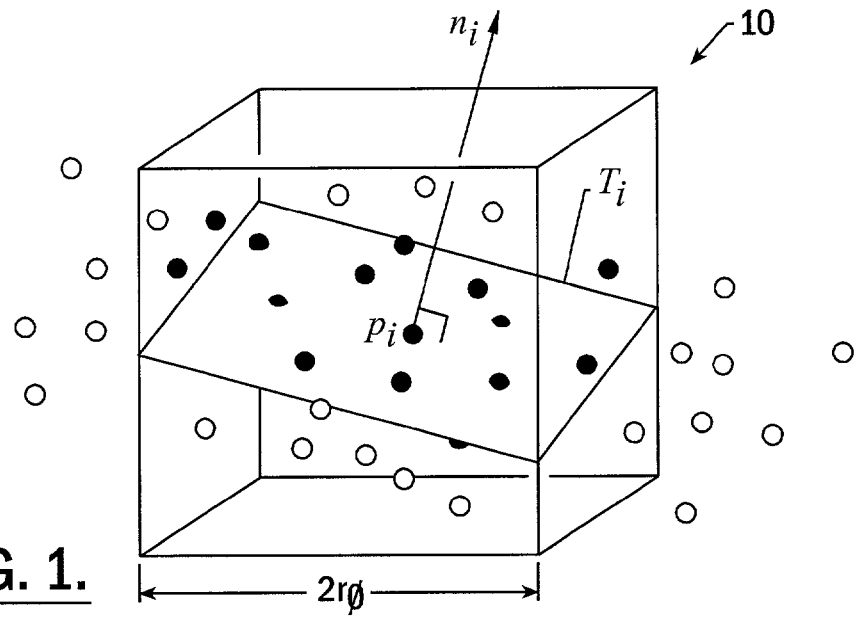
FIG. 1 illustrates a closed axis-aligned cube that may be used when determining collections of near points.

The present invention now will be described more fully hereinafter with reference to the accompanying drawings, in which preferred embodiments of the invention are shown. This invention may, however, be embodied in many different forms and applied to other articles and should not be construed as limited to the embodiments set forth herein; rather, these embodiments are provided so that this disclosure will be thorough and complete, and will fully convey the scope of the invention to those skilled in the art. The operations of the present invention, as described more fully hereinbelow and in the accompanying figures, may be performed by an entirely hardware embodiment or, more preferably, by an embodiment combining both software and hardware aspects and some degree of user input. Furthermore, aspects of the present invention may take the form of a computer program product on a computer-readable storage medium having computer-readable program code embodied in the medium. Any suitable computer-readable medium may be utilized including hard disks, CD-ROMs or other optical or magnetic storage devices. Like numbers refer to like elements throughout.

Various aspects of the present invention are illustrated in detail in the following figures, including flowchart illustrations. It will be understood that each of a plurality of blocks of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the operations specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the operations specified in the flowchart block or blocks.

Accordingly, blocks of the flowchart illustrations support combinations of means for performing the specified operations, combinations of steps for performing the specified operations and program instruction means for performing the specified operations. It will also be understood that each of a plurality of blocks of the flowchart illustrations, and combinations of blocks in the flowchart illustrations, can be implemented by special purpose hardware-based computer systems that perform the specified operations or steps, or by combinations of special purpose hardware and computer instructions.

Methods of modeling three-dimensional (3D) surfaces according to embodiments of the present invention include preferred techniques to reconstruct a surface from data points that at least partially describe the surface. The data points may be generated as point clouds by scanning an object in three dimensions. These reconstruction techniques may include operations to improve the quality of the reconstructed surfaces using numerical approximations of local differential structure to reduce noise and remove outliers from the data points. The numerical approximations of local differential structure may be achieved using differential concepts that include determining surface normals at respective ones of the data points. A local differential structure of a bundle of the surface normals can be used to define principal curvatures and their directions. In particular, a number of substantially non-zero principal curvatures may be used to determine the types of approximating surfaces that can be locally fit to the data points. By construction, these approximating surfaces are typically only sensitive to an average amount of noise that is locally present in the data points. Accordingly, the approximating surfaces vary considerably slower than the points themselves. This difference is preferably exploited in reducing the local variability of the data points and, therefore, the amount of random noise present therein. The same differential concepts may also be used to detect outliers and to subsample the data points in a curvature sensitive manner.

The numerical approximations of local differential structure are preferably obtained using mean square error minimization techniques. A mass distribution matrix (MDM) of a local collection of data points is used to estimate normals and a normal distribution matrix (NDM) of a local collection of normals is used to estimate principal curvature directions. In both cases, a preferred numerical method includes the spectral decomposition of the matrix, which provides direction estimates through eigenvectors and variability estimates through eigenvalues. Numerical stability can be improved by normalizing all input data and by using standard operations for the singular value decomposition of the matrices. Because a time consuming operation includes finding a set of near points for each of a plurality of points in the data point set, an implict oct-tree is used to store the data point set in an efficient manner.

In particular, operations to improve the quality of surfaces generated by surface reconstruction techniques include identifying collections $S_i$ for each of a plurality points $p_i$ (and possibly all points) in a finite three-dimensional (3D) set S of points that are relatively densely distributed on a surface in $\mathbb{R}^3$, where $S_i \subseteq S$ and $p_i \in S_i$. Each collection $S_i$ is referred to herein as the set of "near points" of $p_i$ and is used as a primary source of information about the neighborhood of $p_i$ on the surface. In particular, $S_i$ is the collection of points $p_j \in S$ that lie within a closed and axis-aligned cube 10 that has a side-length of $2r_0$ and is centered at $p_i$. This is illustrated by FIG. 1, where the solid black points located within the cube 10 belong to $S_i$. The real number constant $r_0$ is chosen such that an expected size of the sets of near points $S_i$ is some constant yield, which may be a user-defined integer. Typical values for low, medium and high yield are 25, 50 and 100, respectively. As described more fully hereinbelow, to compute a set of near points $S_i$ for each of a plurality of points $p_i$, the data point set $S \subseteq \mathbb{R}^3$ is stored in an implicit oct-tree. A random sample $R \subseteq S$ is used to compute a width $2r_0$ of a closed and axis-aligned cube 10 having a specified (e.g., user specified) average yield. Then, for each point $p_i \in S$, a subset of $k_0$ nearest points is computed. Those points in the subset that also lie within the cube of width $2r_0$ (centered at $p_i$) are then selected as points in a respective near point set $S_i$. The validity of the operations described herein are independent of the value of the specified average yield, but the value of the yield influences the results they generate and the computing time required to generate the results.

For a given set of near points $S_i$ corresponding to a point $p_i \in S$, the plane that minimizes a mean square distance to the near points necessarily passes through the centroid of the points. The near points may be translated by minus the centroid or, equivalently, the centroid can be treated as the origin and only planes of zero offset relative to the origin need be considered. Each such plane can be written as the set of points $x \in \mathbb{R}^3$ that satisfy the relationship $x^T u = 0$ for some unit normal $u \in S^2$. The sum of the square distances of the points $p_j \in S_i$ from a plane having zero offset is:

$$E_i(u) = \sum_j (p_j^T u)^2$$
$$= u^T \left( \sum_j p_j p_j^T \right) u$$

The mass distribution matrix $M_i = \Sigma p_j p_j^T$ is symmetric and positive semi-definite and thus has three non-negative real eigenvalues $\mu_1 \geq \mu_2 \geq \mu_3$. Accordingly, $M_i = U \Delta U^T$, where:

$$\Delta = \begin{bmatrix} \mu_1 & 0 & 0 \\ 0 & \mu_2 & 0 \\ 0 & 0 & \mu_3 \end{bmatrix}$$

The columns of U are the corresponding unit eigenvectors $e_1$, $e_2$ and $e_3$ in the same order. Multiplication with $U^T$ puts a point $p_j$ into the coordinate frame spanned by the eigenvectors, and multiplication with U puts it back into the original coordinate frame. For a direction $u = u_1 e_1 + u_2 e_2 + u_3 e_3$, the sum of square distance is $E_i(u) = \mu_1(u_1^2) + \mu_2(u_2^2) + \mu_3(u_3^2)$. The preimage of unity is the ellipsoid $E_i^{-1}(1)$, and the half-axes of $E_i^{-1}(1)$ have lengths equal to $(\mu_j)^{-1/2}$ along $u_j$. The unit vector with smallest error is therefore in the direction of the longest half-axis, which is parallel to $e_3$. The plane of best fit, $h_i$, therefore consists of the points x that satisfy $x^T e_3 = 0$. The plane of best fit, $h_i$, typically does not pass through $p_i$. The unit normal $n_i$ to the plane of best fit $h_i$ is treated herein as the estimated normal at $p_i$. To improve run time for situations involving three-by-three matrices, which are the most common, the eigenvalues are computed as the roots of the characteristic polynomial. The first root is approximated by Newton iteration, and the other two by solving the remaining quadratic equation analytically. Other techniques for computing eigenvalues may also be used.

The estimated normals $n_i$ at the points $p_i$ are used to estimate principal curvature directions on the surface (i.e., two principal curvature directions for each point $p_i$). These estimates of principal curvature directions are then used to classify the local neighborhood of each point $p_i$ in terms of its shape characteristics. In particular, the function $F_i : \mathbb{R}^3 \to \mathbb{R}$ is used that sums the square distances to the normal planes passing through the origin, which is defined by:

$$F_i(x) = \sum_{p_j \in S_i} (x^T n_j)^2$$
$$= x^T \left( \sum_{p_j \in S_i} n_j n_j^T \right) x.$$

Similar to the mass distribution matrix $M_i$, the normal distribution matrix $N_i = \Sigma n_j n_j^T$ is symmetric and positive semi-definite with non-negative eigenvalues $v_1 \geq v_2 \geq v_3$. A large eigenvalue corresponds to a direction in which the sum of squared scalar products or, equivalently, the sum of square distances to the normal planes increases quickly.

Accordingly, a set of near points $S_i$ can be treated as having plane-like configuration if there is only one such principal curvature direction or, equivalently, only one large eigenvalue.

Figure 2:
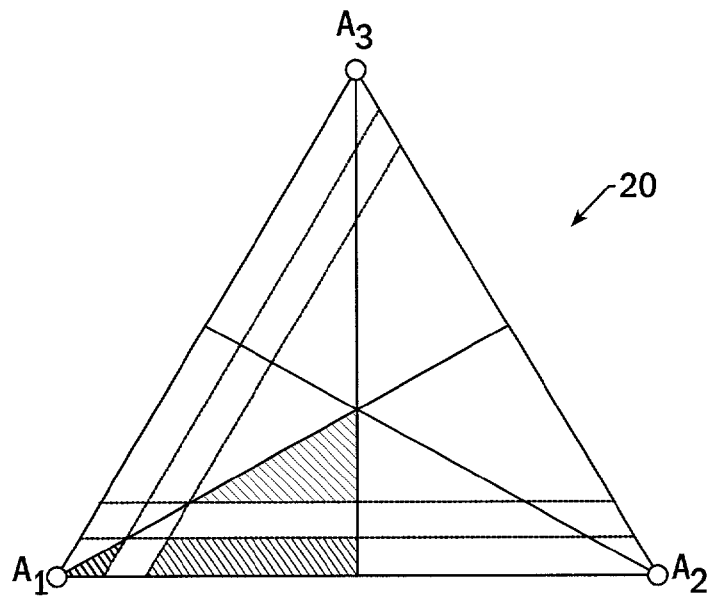

Operations to classify a local neighborhood of each point $p_i$ in terms of its shape characteristics continue by normalizing the eigenvalues to $t_l = (v_l)(v_1 + v_2 + v_3)^{-1}$, for $l = 1, 2$ and 3, where $t_1 + t_2 + t_3 = 1$ and $t_1 \geq t_2 \geq t_3$. As illustrated by FIG. 2, the triplets of numbers $t_l$ that satisfy these conditions define a triangle in a barycentric subdivision of a standard triangle. The smaller two eigenvalues correspond to the two principal curvatures. Neighborhoods with two, one and zero substantially non-zero principal curvatures are classified using two constants $\epsilon_0$, $\epsilon_1$ that meet the following relationship: $0 < \epsilon_0 < \epsilon^1 < \frac{1}{3}$. The shape classification thresholds $\epsilon_0$ and $\epsilon_1$ may be set at 0.0075 and 0.015, respectively. A set of near points $S_i$ is treated as strongly plane-like, edge-like or corner-like based on the following relationships:

plane-like $\Leftrightarrow \epsilon_0 \geq t_2 \geq t_3$ edge-like $\Leftrightarrow \epsilon_0 \geq t_3$ and $\epsilon_1 \leq t_2$ corner-like $\Leftrightarrow \epsilon_1 \leq t_3 \leq t_2$.

Similarly, a set of near points $S_i$ is treated as being weakly plane-like, weakly edge-like and weakly corner-like if the normalized eigenvalues satisfy the same inequalities with $\epsilon_0$ and $\epsilon^1$ interchanged. As illustrated by FIG. 2, the points $t_1 A_1 + t_2 A_2 + t_3 A_3$ populate the lower left triangle in the barycentric subdivision of the standard triangle $A_1 A_2 A_3$ 20. The light, medium and dark shaded areas correspond to data point sets that are strongly corner-like, strongly edge-like and strongly plane-like, respectively. The white strips between the shaded areas correspond to data point sets that have at least two weak classifications. FIG. 2 also illustrates that each set of near points $S_i$ has at most one strong classifier, and if it has no strong classifiers then it has at least two weak classifiers. More precisely, the region of multiple weak classifications overlaps the region of strong classifications only along a boundary. The normalized eigenvalues can therefore be used to express each multiple weak classification as a linear combination of strong classifications.

The normalized eigenvalue $s_l$ equals $(t_l - \epsilon_0)/(\epsilon_1 - \epsilon_0)$, provided that $\epsilon_0 \leq t_{l \leq \epsilon_1}$, and this is the solution to the linear interpolation $t_l = (1 - s_l) \epsilon_0 + s_l \epsilon_1$ between $\epsilon_0$ and $\epsilon_1$. The normalized eigenvalues $s_2$ and $s_3$ are used to linearly interpolate between strong classifications. For Case 1, where $t_3 < \epsilon_0 \leq t_2 \leq \epsilon_1$, the set of near points $S_i$ is both weakly plane-like and weakly edge-like, but not weakly corner-like. The normalized eigenvalue $s_2$ is defined, and for $S_i$ the fraction $1 - s_2$ is considered strongly plane-like and the fraction $s_2$ is considered strongly edge-like. For Case 2, where $\epsilon_0 \leq t_3 \leq t_2 \leq \epsilon_1$, the set of near points $S_i$ has all three weak classifications. For the set of near points $S_i$, the fraction $1 - s_2 - s_3$ is considered plane-like, the fraction $s_2$ is considered edge-like and the fraction $s_3$ is considered corner-like. For Case 3, where $\epsilon_0 < t_3 < \epsilon_1 < t_2$, the set of near points $S_i$ is both weakly edge-like and weakly corner-like, but not weakly plane-like. For the set of near points $S_i$, the fraction $1 - s_3$ is considered strongly edge-like and the fraction $s_3$ is considered strongly corner-like.

In regions of low curvature, the local surface can be approximated by a plane and the plane of best fit $h_i$ can be determined directly from the mass distribution matrix (MDM). In regions of non-trivial curvature, the local shape can be approximated by surfaces that are more complicated than planes. Cylinders with conic cross-sections can be used for near point sets $S_i$ that are edge-like and paraboloids can be used for near point sets $S_i$ that are corner-like.

The set of near points $S_i$ is edge-like if the normals lie roughly along a great-circle of the sphere of directions. The best approximation of the direction normal to that great-circle is the eigenvector that corresponds to the smallest eigenvalue of the normal distribution matrix (NDM). This is an approximation of the minor principal curvature direction, which will be referred to herein as a fold direction. The local shape can be approximated by a cylinder constructed by sweeping a line parallel to the fold direction along a conic in the orthogonal plane. Let $g_i$ be this plane passing through $p_i$, and let $S_i'$ consist of the points in $S_i$ projected along the fold direction onto $g_i$. The conic $g_i$ is constructed by least square optimization. The family of conics considered are the zero-sets of the functions $G_i: \mathbb{R}^2 \to \mathbb{R}$ defined by:

$$G_i(x) = a_1 x_1^2 + a_2 x_1 x_2 + a_3 x_2^2 + a_4 x_1 + a_5 x_2 + a_6,$$

where $x_1$ and $x_2$ are the coordinates in $g_i$ measured along the other two eigenvector directions, using $p_i$ as the origin. The family of conics contains pairs of intersecting lines as limits of progressively narrower hyperbolas. These intersecting lines are important because they model common sharp edges on the surface. Multiplying the entire polynomial by a constant does not change the zero-set, so the assumption that $\Sigma a_j = 1$ can be used. The function $G_i$ may be treated as an affine function $\mathbb{R}^5 \to \mathbb{R}$ that takes a point in homogeneous coordinates, $x^T = (x_1^2, x_1 x_2, x_2^2, x_1, x_2, 1)$, to the residual, $G_i(x)$. Each point $p_j' \in S_i'$ defines such a point $x_j \in \mathbb{R}^5$. The affine function that minimizes a sum of the squared residuals is:

$$\sum_j G_i(x_j)^2 = \sum_j (x_j^T a)^2$$
$$= a^T \left( \sum_j x_j x_j^T \right) a,$$

where $a^T = (a_1, a_2, a_3, a_4, a_5, a_6)$. The six-by-six matrix $X^i = \Sigma x_j x_j^T$ is again symmetric and positive semi-definite and thus has six non-negative real eigenvalues. The affine function of best fit is determined by the unit eigenvector a that corresponds to the smallest of the six eigenvalues.

When the matrix $X_i$, which is computed for an edge-like neighborhood, has two almost equally small eigenvalues, then the conic of best fit may be ambiguous. In this case, a preferred operation considers both corresponding conics and projects the point to the closest of the points computed for both conics.

The sets of near points $S_i$ that are corner-like permit the largest amount of variation and, therefore, are typically the most difficult to locally approximate. Ideally, a family of surfaces that contains triplets of intersecting planes is used. The family of zero-sets of cubic polynomials in three variables contains such triplets but leads to linear systems with as many as twenty unknowns. Contrasting this with the fact that points with corner-like neighborhoods are naturally the least common in surfaces bounding physical artifacts, an option is pursued that allows a solution of a significantly smaller optimization problem. The specific problem is finding the optimum function in the family of functions $G_i$ defined above. The coordinate frame, within which the functions $G_i$ are considered, consist of the three unit eigenvectors of the normal distribution matrix (NDM). Specifically, $x_3$ is measured in the surface normal direction, which is approximated by the eigenvector that corresponds to $v_1$, and $x_1$, $x_2$ are measured in the other two eigenvector directions.

The minimization problem is different from the above because the graph of $G_i$, and not the zero-set of $G_i$, is of interest. $G_i$ is again interpreted as an affine function $\mathbb{R}^5 \to \mathbb{R}$. For each $p_j \in S_i$, $x_j$ is defined as described above and $z_j$ is treated as the $x_3$-coordinate of $p_j$ within the frame of eigenvectors. The new residual is $G_i(x_j) - z_j$ and the sum of squared residuals is computed as:

$$H_i(a) = \sum_j (G_i(x_j) - z_j)^2$$
$$= a^T X_i a - 2 a^T y_i + \sum_j z_j^2$$

where:
$$y_i = \sum_j z_j x_j.$$

To compute the minimum a, all partial derivatives are set to zero. This yields:

$$\frac{\partial H_i(a)}{\partial a_l} = \frac{\partial a^T}{\partial a_l} X_i a + a^T X_i \frac{\partial a}{\partial a_l} - 2 \frac{\partial a^T}{\partial a_l} y_i$$
$$= X_{il}^T a + a^T X_{il} - 2 y_{il},$$

for $1 \leq l \leq 6$, where $X_{il}$ is the lth column of $X_i$ and $y_{il}$ is the lth entry in $y_i$. Thus, the minimum a is the solution to the linear system $X_i a = y_i$. This system can be treated as well-conditioned.

The purpose of computing the approximating surfaces is to improve the quality of the description of the surface defined by the data point set. The primary goals are to reduce noise and remove outliers. The type of noise that is typically reduced is manifested by points that are close to but extend slightly above or below the surface. It is a common phenomenon in scanned data and can be caused by a variety of shortcomings of the scanning hardware. The approach to reduce noise is based on the observation that the approximating surface varies only slightly for nearby points, simply because it is computed from sets of near points $S_i$ that are largely the same. Noise is preferably reduced by moving each point $p_i$ onto the approximating surface computed for $S_i$. Three cases are distinguished as follows.

In the first case, $S_i$ is plane-like. The approximating surface is the plane of best fit $h_i$ with normal vector $n_i$. By construction, the centroid of $S_i$ lies on this plane. The point $p_i$ is moved to its orthogonal projection on $h_i$. The orthogonal projection of the point is $p_i''$, where:

$$p_i'' = p_i - ((p_i - \bar{p}_i)^T n_i) n_i,$$

and the centroid is represented as $\bar{p}_i$. The point $p_i''$ may also be referred to as the de-noised location of $p_i'$.

In the second case, $S_i$ is edge-like. The surface is a cylinder whose cross-section in $g_i$ is the conic of best fit, $G_i^{-1}(0)$. The gradient of $G_i$ at a point $x \in g_i$ is:

$$\nabla G_i(x) = \begin{bmatrix} 2a_1x_1 + a_2x_2 + a_4 \\ a_2x_1 + 2a_3x_2 + a_5 \end{bmatrix}.$$

By construction, $p_i$ lies at the origin of $g_i$, which implies that the gradient at $p_i$ is:

$$\nabla G_i(0) = [a_4, a_5]^T,$$

The point $p_i$ can be moved iteratively in small steps along the gradient. Since $p_i$ is mostly already very close to the conic, this iterative procedure is simplified and the point $p_i$ is moved in one step. Formally, the projection of $p_i$ is computed as:

$$p_i'' = t[a_4, a_5]^T,$$

such that:

$$G_i(p_i'') = t^2(a_1 a_4{}^2 + a_2 a_4 a_5 + a_3 a_5{}^2) + t(a_4{}^2 + a_5{}^2) + a_6$$

vanishes. Both roots of this quadratic polynomial are computed, and the point $p_i''$ that is closest to point $p_i$ is selected.

In the third case, $S_i$ is corner-like. The approximating surface is the graph of the quadratic function $G_i$ of best fit. The point $p_i$ is projected in the $x_3$-direction onto that graph. By construction, $p_i$ is the origin of the coordinate system, so $p_i'' = (0, 0, G_i(0))$, again expressed in the local coordinate frame spanned by the eigenvectors of the normal distribution matrix. For strongly classified sets $S_i$, the point $p_i''$ is substituted for $p_i$. For sets $S_i$ with mixed weak classifications, two or three points $p_i''$ are computed and the linear combination is substituted for $p_i$. In each case, the point $p_i''$ is dropped from the computations if the fit of the surface is not sufficiently tight, or more specifically, if the normalized smallest eigenvalue exceeds some constant $\delta_0$. Such cases are unlikely for plane-like and edge-like sets, because the surfaces typically fit well to the data points, but they are relatively more common for corner-like sets. Corner-like neighborhoods may be better approximated by implicit cubic polynomials, which include triplets of planes in their family. Many cases occurring in practice could also be improved by approximations within certain sub-families of surfaces, such as intersections of planes with circular cylinders or cones.

Outliers are points that are far from the surface and may be created either by mistake or by physical shortcomings of the scanning hardware. Outliers may cause trouble in the reconstruction of the surface and are preferably removed before they do so. Because the surface is not known, outliers can be detected only with indirect methods. A straightforward approach for detecting outliers specifies a threshold and removes points whose square distances to the planes of best fit exceed that threshold. A drawback of this method is that many or all points with edge-like and corner-like neighborhoods are likely to be classified as outliers. This method is refined by observing that points in such edge or corner regions have near points with similarly large square distances to their planes of best fit. To discriminate between points with and without such near points, the average square distance between points and corresponding planes of best fit are considered. This average is:

$$\overline{D} = \frac{1}{n} \sum_i ((p_i - \overline{p}_i)^T n_i)^2.$$

The point $p_i$ is treated as an outlier if its square distance exceeds a constant times the average as expressed by:

$$(p_i{}^T n_i))^2 > C_0 \overline{D}.$$

After computing all square distances, the outliers are identified by evaluating this simple inequality. It can easily be modified by adjusting the constant $C_0$. The above-described operations may be treated as preprocessing operations that reduce noise and remove outliers from the data points so that the quality of surfaces reconstructed therefrom can be improved.

Operations to reconstruct three-dimensional (3D) surfaces from dense and locally two-dimensionally distributed data points sets (e.g., point clouds) will now be described. As described above, these data point sets preferably undergo preprocessing operations to reduce noise and remove outliers, before reconstruction operations are performed. These reconstruction operations include generating a plurality of stars by locally projecting sampled points within a point set onto estimated tangent planes and then merging the stars in two-dimensional Delaunay triangulations within the estimated tangent planes. The Delaunay triangulations are preferably constructed as weighted Delaunay triangulations, however, Delaunay triangulations having unweighted vertices may also be constructed if less accurate results or less efficient operations are acceptable. The reconstruction operations return a two-dimensional simplicial complex in which the edges and triangles that share a vertex form a portion of an open disk. Such complexes are treated herein as pseudomanifolds.

Although the surface reconstruction operations described herein are based on concepts from differential geometry, they may be classified as surface meshing operations. The reconstruction operations may be arranged in four stages, and rely on the data point set $S \subseteq \mathbb{R}^3$ being densely sampled on the surface of an object or otherwise densely generated. These four stages include:

(A) Finding, for each of a plurality points $p_i \in S$, a respective subset of near points $S_i \subseteq S$, which contains $p_i$;

(B) Estimating a tangent plane using $S_i$, projecting $S_i$ onto that plane, and constructing the star of $p_i$ in the two-dimensional Delaunay triangulation;

(C) Eliminating edges and triangles that do not belong to the stars of all their vertices, and constructing the surface from what remains; and (D) Performing post-processing by identifying and filling holes in the surface created by the elimination of edges and triangles during stage C.

As described above with respect to FIG. 1, the operations of stage A, which include searching for and identifying a respective set of near points $S_i$ for each of a plurality of points $p_i$, can be time-consuming. To improve the efficiency of determining a respective set of near points $S_i$ for each of a plurality of points $p_i$, a data structure that exploits the locality of the access is used for repeated searching. The near point search operations include storing an input set $S \subseteq \mathbb{R}^3$ in an implicit oct-tree and then using a random sample $R \subseteq S$ to compute a width $2r_0$ of cubes having a specified average yield $m_0$. For each point $p_i \in S$, a subset of $k_0$ nearest points that lie in the cube of width $2r_0$, centered at $p_i$, is computed. To describe this in mathematical terms, the box function $\Box_i(r)$ is defined as the set of points $p_j \in S$ with an $l_\infty$-distance at most r from point $p_i$, where r is a real number. Stated alternatively, the box function defines a set of points $p_j$ that are contained within the closed axis-aligned cube of width 2r centered at $p_i$. Now using the Euclidean distance, we define $N_i(k)$ as the set of k points closest to $p_i$, including $p_i$ itself. The set of near points of $p_i$ is then:

$$S_i = \Box_i(r_0) \cap N_i(k_0),$$

where $r_0$ is the positive real number computed to achieve a specified average yield and $k_0$ is a positive integer constant. It makes sense to define $k_0$ a few times the average degree of a vertex in a flat triangulation, which is about six. In a typical case, $k_0=30$.

Figure 3:
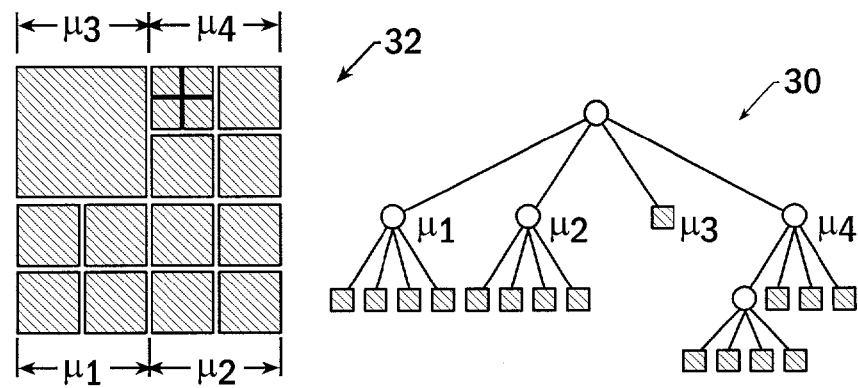
FIG. 3 illustrates construction of an oct-tree in two dimensions.

Operations for constructing an oct-tree will now be described. Additional information relating to the construction of oct-trees can be found in a two-volume textbook by H. Samat, entitled Spatial Data Structures: Quadtrees, Octrees, and Other Heirarchical Methods, Addison-Wesley (1989). Upon normalization, the input data point set can be treated as being contained in a half-open unit cube, $S \subseteq [0, 1)^3$. The oct-tree corresponds to a recursive decomposition of this half-open cube into eight congruent half-open cubes. FIG. 3 illustrates the construction of an oct-tree 30 in two dimensions, where a square 32 is recursively decomposed into four smaller squares. Each node $\mu_i$ of the oct-tree 30 is assigned an integer address that encodes the path from the root to $\mu_i$. Three bits per level are required in the illustrated example, which allows at most $l_0=10$ levels in order to fit each address into a 32 bit word. The oct-tree is constructed from top down, with each node being decomposed as long as its level is less than $l_0$ and the number of points in its half-open cube exceeds $n_0=30$.

A leaf is a node that is not decomposed any further. The oct-tree is represented by its pre-order sequence of leaves and a parallel sequence of points. The ordering provides that the points that lie inside a cube of a node are contiguous in the second sequence. Each leaf stores its address and the index interval of the points in its cube. Navigation is done through bit manipulations of node addresses. The problem of enumerating all points inside a cube C will now be considered as an example. Let $C(\mu)$ be the half-open cube of node $\mu$, let $S(\mu) = S \cap C(\mu)$, and write $\rho$ for the root of the oct-tree. The points in C can be found by calling function POINTS with $\mu=\rho$, as illustrated by the following program code:

```
void POINTS (C, μ)
    if C(μ) ⊆ C then return S(μ) endif;
    if C(μ) ∩ C ≠ 0 then
        if μ is a leaf then return S(μ) ∩ C endif;
        forall children ν of μ do POINTS (C, ν) endfor
    endif.
```

The next operation includes computing a distance $r_0$ that is small enough (but not too small) to estimate differential properties of the surface. Two empirically tested constants $m_0=100$ and $s_0=100$ can be used, where $m_0$ represents a desired average yield that may be selected by a user and $s_0$ represents the size of the random sample $R \subseteq S$.

The yield of an axis-aligned cube is defined as the number of points of S it contains. For a given real number $r>0$, the average yield is computed from all axis-aligned cubes of width 2r centered at points in S. The real number $r_0$ is defined as the smallest value of r for which the average yield is at least $m_0$. Computing this value of r is typically time-consuming, but it can be estimated quickly by choosing a random sample $R \subseteq S$ of size $s_0$, and computing the average yield $m(r)$ over the cubes centered at points in R. The real number $r_0$ is computed as the minimum value of r for which $m(r) \geq m_0$. To save time, a small estimate is used as a start and then it is improved by first growing and then by shrinking the interval, as illustrated by the following program code:

```
a=0.0; b=0.001;
while m(b)<m₀ do b=2b endwhile;
for i=1 to l₀ do x=(a+b)/2;
    if m(x)<m₀ then a=x else b=x endif
endfor.
```

After completing the iteration, $r_0=b$ can be used, which may be a little larger than promised, or $r_0$ can be selected as the $s_0 m_0$ smallest distance defined by the points in the sets $\Box_i(b)$, over all $p_i \in R$. Important operations include (i) computing $m(r)$ and (ii) selecting from a set of distances. The former uses function POINTS illustrated above and the latter is performed using a one-sided version of randomized quicksort, which is described more fully hereinbelow.

Operations to compute the sets $S_i$ of near points, for all $p_i \in S$ will now be described. These operations may be the same as those used to determine the width of the near point search cube, but speed is more critical because the operations to compute sets of near points are applied to more points. The value $C_i$ is written for the axis-aligned cube of width $2r_0$ with center $p_i$ and $\rho$ for the root of the oct-tree, as illustrated by the following program code:

```
for i=1 to n do
    N=POINTS(Cᵢ, ρ);
    select Sᵢ as subset of k₀ points in N closest to pᵢ
endfor.
```

A one-sided version of randomized quicksort is used to select points. To understand this operation, suppose N is a linear array storing the points in an arbitrary order. Quicksort splits the array using a randomly chosen pivot point, p. Specifically, function SPLIT rearranges the array so that the points to the left of p are closer to $p_i$ and the points to the right of p are farther from $p_i$. The function then returns the position of the pivot. Instead of recursively sorting on both sides of that position, the recursive sort is performed only on one side. Initially, lo and hi are the first and last indices in N and $k=k_0$. These operations are illustrated by the following program code:

```
integer SELECT (k, lo, hi)
    assert lo ≤ lo+k−1 ≤ hi;
    if lo=hi then return lo endif;
    mid=SPLIT (lo, hi);
    if k ≤ mid−lo then SELECT (k, lo, mid−1)
        else if k=mid−lo+1 then return mid
        else SELECT(k−mid+lo−1, mid+1, hi)
    endif.
```

The expected running time for m input points is O(m), with a reasonably small constant of multiplicity. The operation SELECT is called repeatedly, with an average size of N being equal to about $m_0$. Because the SELECT operation is typically executed a large number of times, it is important that it be optimized for this input point size.

Operations to construct stars, stage B, can be considered as a sequence of operations that include:
(B1) Using points in $S_i$ to estimate the normal $n_i$ and the estimated tangent plane $T_i$: $(x, n_i)=0$ at $p_i$;
(B2) Projecting the points in $S_i$ to form the set $S_i'$ 40 of weighted points in $T_i$, which contains points $p_i'$; and
(B3) Computing the star of $p_i'$ in the weighted Delaunay triangulation of $S_i'$.

It is preferred that operations B1, B2 and B3 are performed for each point $p_i \in S$. Each edge of the resulting triangulation can occur in up to two stars and each triangle can occur in up to three stars. Moreover, as explained more fully hereinbelow, weights are preferably used to counteract distortion caused by the projection of the points in $S_i$ to form the set $S_i'$ of weighted points in $T_i$.

The operations B1 assume that each set of near points $S_i$ is sampled from a small and smooth neighborhood of the point $p_i$, and that the points $p_j \in S_i$ lie close to the plane tangent to the surface and passing through $p_i$. Because the surface to be reconstructed is not known, the locations of planes tangent to the surface are also not known. Nonetheless, the tangent planes may be estimated from respective sets of near points $S_i$. In particular, each estimated tangent plane $T_i$ is computed as the two-dimensional dimensional linear subspace of $\mathbb{R}^3$ that minimizes the sum of square distances to the points $p_j - p_i$, over all $p_j \in S_i$. The definitions of $T_i$ as the estimated tangent plane at $p_i$ and $n_i$ as the estimated normal at $p_i$ are illustrated in FIG. 1.

The operations B2 include determining weighted points in $T_i$. In particular, for each point $p_j \in S_i$, the projected point $p_j' = (p_j'', w_j)$ is the weighted point in $T_i$, where:

$$p_j'' = (p_j - p_i) - \langle p_j - p_i, n_i \rangle n_i$$

is the orthogonal projection of $p_j - p_i$ onto $T_i$ and $w_j = -(p_j - p_i, n_i)^2$ is the negative square distance of that point from $T_i$. We use the weight to counteract the distortion of the inter-point distances. To explain this, we define the weighted square distance of a point $x \in T_i$ from $p_j'$ as:

$$\Pi_j(x) = \|x - p_j''\|^2 - w_j,$$

which is the Euclidean square distance of x from $p_j$. As described in a textbook by H. Edelsbrunner, entitled "Geometry and Topology for Mesh Generation," Cambridge Univ. Press (2001), the disclosure of which is hereby incorporated herein by reference, a weighted Voronoi region of $p_i'$ is the set of points $x \in T_i$ whose weighted square distance to $p_i'$ is no larger than any other weighted point, $V_i = \{x \in T_i | \Pi_i(x) \leq \Pi_j(x), \forall_j\}$. It is also the intersection of the three-dimensional (unweighted) Voronoi cell of $p_i$ with the plane $T_i$. The rationale is that as long as $T_i$ intersects the Voronoi cell for $p_i$ in the same set of facets and edges as the hypothetical surface, the star of $p_i'$ in the weighted Delaunay triangulation (the dual of the weighted Voronoi diagram) is the projection of the star of $p_i$ in the restricted Delaunay triangulation (the dual of the intersection between the three-dimensional Voronoi diagram and the hypothetical surface). The concept of a restricted Delaunay triangulation is more fully described in the article by H. Edelsbrunner and N. R. Shah, entitled "Triangulating Topological Spaces," Internat. J. Comput. Geom Appl., Vol. 7, pp. 365–378 (1997), the disclosure of which is hereby incorporated herein by reference. In other words, the stars in the two-dimensional weighted Delaunay triangulations are the closest representations to an ideal reconstruction, which is the restricted Delaunay triangulation.

Understanding the operations B3 for computing the star of $p_i'$ in the weighted Delaunay triangulation of $S_i'$ requires a basic understanding of weighted Delaunay triangulations in a plane, which will now be provided. The weighted square distance to two weighted points $p_i' = (p_i'', w_i)$ and $x' = (x,w)$, can be generalized as:

$$\Pi_i(x') = \|p_i'' - x\|^2 - w_i - w.$$

Figure 4:
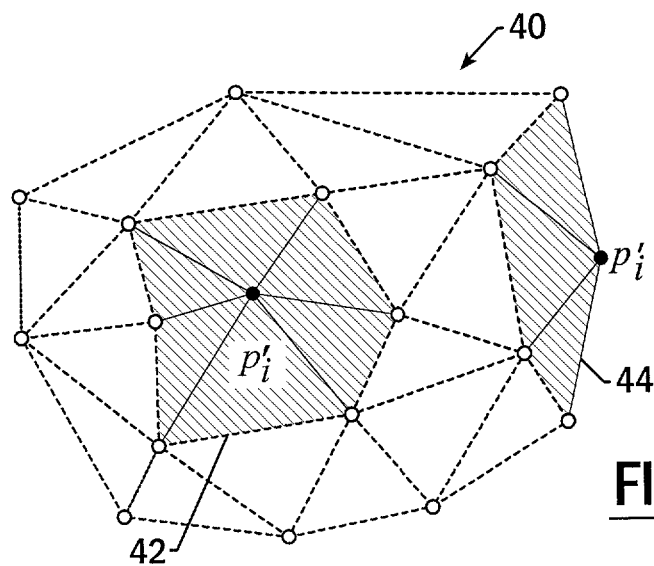
FIG. 4 illustrates shaded stars within a weighted Delaunay triangulation.

The two weighted points are orthogonal if $\Pi_i(x') = 0$, which in geometric terms means that the circles centered at $p_i''$ and x with radii $w_i^{1/2}$ and $w^{1/2}$ intersect at a right angle. The two weighted points are considered closer than orthogonal if $\Pi_i(x') < 0$ and farther than orthogonal if $\Pi_i(x') > 0$. In the plane, for any three weighted points $p_i'$, $p_j'$ and $p_k'$, there is a unique weighted point x' that is orthogonal to all three. This weighted point x' is the orthocenter of $p_i'$, $p_j'$ and $p_k'$. If $S_i'$ is the collection of weighted points in $\mathbb{R}^2$, by duality to the weighted Voronoi diagram, the weighted Delaunay triangulation of $S_i'$ consists of all triangles $p_i'' p_j'' p_k''$ for which the orthocenter of $p_i'$, $p_j'$ and $p_k'$ is farther than orthogonal to all other weighted points in $S_i'$. As described at section 1.4 of the aforementioned textbook by H. Edelsbrunner, the genericity of the set of weighted points can be simulated to avoid ambiguities in the characterization of the weighted Delaunay triangulation. An example of a two-dimensional weighted Delaunay triangulation 40 is illustrated by FIG. 4, where the shaded star of $p_i'$ within the weighted Delaunay triangulation of $S_i'$ is either an open disk or an open half-disk.

The star of a projected point $p_i'$, denoted herein as St $p_i'$, consists of the point $p_i'$ and all edges and triangles in $D_i'$ that contain $p_i'$ as a vertex. The underlying space of the star is the union of the interiors of its simplices, as defined by the following relationship:

$$|St\, p_i'| = \cup_{\sigma \in St\, p'i}\, \text{int } \sigma.$$

Two cases can be distinguished, based on whether the projected point $p_i'$ is an interior vertex or a boundary vertex. If $p_i'$ is an interior vertex of the weighted Delaunay triangulation, then the edges and triangles in the star alternate and close a ring about the vertex. In this case, the underlying space is an open disk. However, if $p_i'$ is a boundary vertex of the triangulation, then the edges and triangles still alternate, but form only a sequence about the vertex. In this case, the underlying space is an open half-disk. Both cases are illustrated by the shaded stars in FIG. 4. When the projection is not important or reversed, then reference may be made to the star of $p_i$ instead of the star of $p_i'$.

The operations B3 include computing the star of $p_i'$ in a counterclockwise order around $p_i'$. As described herein, the distance between two weighted points will be computed as the weighted square distance between the two weighted points. These operations begin by renaming the weighted points such that $q_0 = p_i'$, $q_1$ is the weighted point closest to $q_0$, and $q_1, q_2, \ldots, q_{k-1}$ is the counterclockwise order of the weighed point around $q_0$. An ambiguity in the order arises when two weighted points lie on the same half-line emanating from $q_0$ and this ambiguity is resolved by throwing away the weighted point farther from $q_0$. It is convenient to repeat $q_k = q_1$ at the end of the ordering. To distinguish the interior from the boundary vertex case, the orientation of point triplets is tested. Using Greek letters for the x and y Cartesian coordinates in $T_i$, the orientation of the point triplet qrs is the sign of the determinant of the matrix $\Gamma$, where $q = (\psi_1, \psi_2)$, $r = (\rho_1, \rho_2)$ and $s = (\sigma_1, \sigma_2)$:

$$\Gamma = \begin{bmatrix} 1 & \psi_1 & \psi_2 \\ 1 & \rho_1 & \rho_2 \\ 1 & \sigma_1 & \sigma_2 \end{bmatrix}.$$

A positive orientation means that a left-turn is taken at r, coming straight from q and going straight to s. The interior vertex case is characterized by the property that all triplets $q_0 q_j q_{j+1}$ have positive orientation. In the boundary vertex case, there is precisely one index j for which $q_0 q_j q_{j+1}$ does not have positive orientation. The vertices are then relabeled so that $q_{j+1}$ is the first and $q_j$ is the last in the counterclockwise ordering around $q_0$. In contrast to the interior vertex case, the first vertex is not repeated at the end of the ordering.

Figure 5:
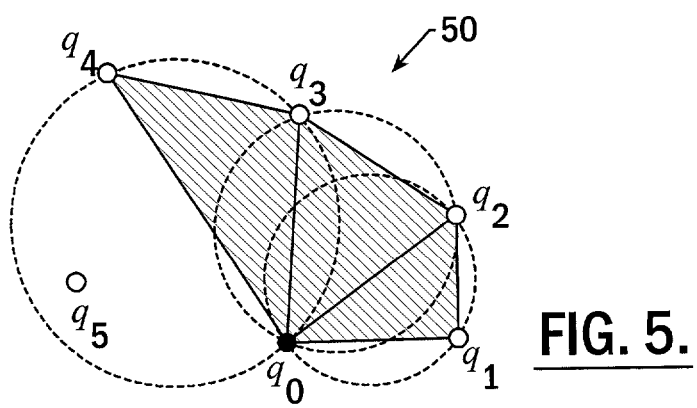
FIG. 5 illustrates sequential operations to construct a star.

With these preparations, the operations for constructing the star are the same for both interior and boundary vertices and are performed incrementally. For each new weighted point, all triangles whose orthocenters are closer than orthogonal are removed and then one new triangle is added to the star. At any moment, the star is a sequence of triangles, as illustrated in FIG. 5. In FIG. 5, if all weights $w_i$ are assumed to be zero, the new point $q_5$ is closer than orthogonal to the orthocenters of the last triangle $q_0 q_3 q_4$ in the shaded partial star 50. That last triangle is removed before $q_5$ is added as a vertex of the new last triangle $q_0 q_3 q_5$. The operations PUSH, POP, TO and ISEMPTY are used to manipulate an initially empty stack that stores the sequence of vertices on the boundary of the partial star:

PUSH$^2$($q_1$, $q_2$);
for j=3 to k do
   loop r, s=TOP$^2$;
      if TOOCLOSE($q_0$, r, s, $q_j$) then POP
      else PUSH ($q_j$); exit
      endif
   forever
endfor.

The boolean function TOOCLOSE tests whether or not the point $q_j$ is closer than orthogonal to the orthocenters of $q_0$, r, and s. Using again Greek letters for the coordinates and the weights, the matrix $\Lambda$ is defined as:

$$\Lambda = \begin{bmatrix} 1 & \psi_1 & \psi_2 & \psi_1^2 + \psi_2^2 - \psi_w \\ 1 & \rho_1 & \rho_2 & \rho_1^2 + \rho_2^2 - \rho_w \\ 1 & \sigma_1 & \sigma_2 & \sigma_1^2 + \sigma_2^2 - \sigma_w \\ 1 & \tau_1 & \tau_2 & \tau_1^2 + \tau_2^2 - \tau_w \end{bmatrix},$$

for $q=q_0$, r, s and $t=q_j$. The weighted point t $(=(\tau_1, \tau_2))$ is orthogonal to the orthocenter of qrs if and only if det $\Lambda=0$. The triplet qrs has positive orientation, by construction, and it follows that the determinant of the upper left three-by-three submatrix (in the above matrix $\Lambda$) is positive. Hence, t is farther than orthogonal to the orthocenter if and only if det $\Lambda>0$. The following operations are thus defined:

boolean TOOCLOSE (q, r, s, t)
   return det $\Lambda<0$.

The running time of the star construction operations is O(k log k) for sorting plus O(k) for constructing the star as described above.

The operations to compute stars may result in stars that share triangles and edges with other stars and stars that conflict with other stars, because the operations are performed independently in the various estimated tangent planes. In the event a conflict is present, the edges and triangles that are in conflict are eliminated and the remainder of edges and triangles that are not in conflict are merged into a single surface description.

Operations to merge stars, stage C, can be treated as a sequence of four sub-operations that include:

(C1) Sorting F, which is a list of all triangles in the stars, and remove all triangles that are not in triplicate;
(C2) Connecting the remaining triangles to form a triangulated pseudomanifold;
(C3) Sorting E, which is a list of edges in stars that do not belong to any triangles in the pseudomanifold, and remove all edges that are not in duplicate; and
(C4) Adding the remaining edges to the triangulated pseudomanifold.

The representation of the pseudomanifold created in operations C2 and C4 may be referred to as a trist data structure. In the operation C1 to sort triangles, each triangle is represented by the ordered triplet of indices of its vertices, ijk with i<j<k. The sort operation is performed lexicographically:

$$ijk \text{ precedes } i'j'k' \text{ if } \begin{cases} i < i', \\ i = i' \text{ and } j < j', \text{ or} \\ i = i', j = j', \text{ and } k < k'. \end{cases}$$

The use of contiguous integers suggests the use of a radix sort operation, rather than a comparison-based sorting operation. To describe the radix sort operation, n is defined as the number of points in S and B[1 . . . n] is defined as a linear array of buckets. Each bucket is initially an empty stack of integer pairs. In the first phase, the triangles are spread using the smallest of the three vertex indices as the address in B. The operation PUSH$_i$ (j,k) is used to add the pair jk to the i-th bucket:

forall i do
   forall triangles $p_i p_j p_k \in$ St $p_i$ do
      rename indices such that i<j<k; PUSH$_i$(j,k)
   endfor
endfor.

A single vertex belongs to at most some constant number of triangles. The sorting operation can therefore be finished by calling quicksort for each bucket without paying a logarithmic term in comparison to additional phases of a radix sort. After sorting, B[i] contains the triangles ijk lexicographically sorted by jk. The triangles that are not in triplicate can thus be eliminated by scanning. The operations POP$_i$, TOP$_i$, and ISEMPTY$_i$ can be used to manipulate the i-th bucket. The triangles that occur three times are collected in an initially empty list F, which is extended using function ADD. The following pseudocode illustrates these operations:

for i=1 to n do
   while not ISEMPTY$_i$ do jk=POP$_i$;
      if TOP$_i$=jk then jk=POP$_i$;
         if TOP$_i$=jk then jk=POP$_i$; ADD (ijk) end if
      endif
   endwhile
endfor.

Figure 6:
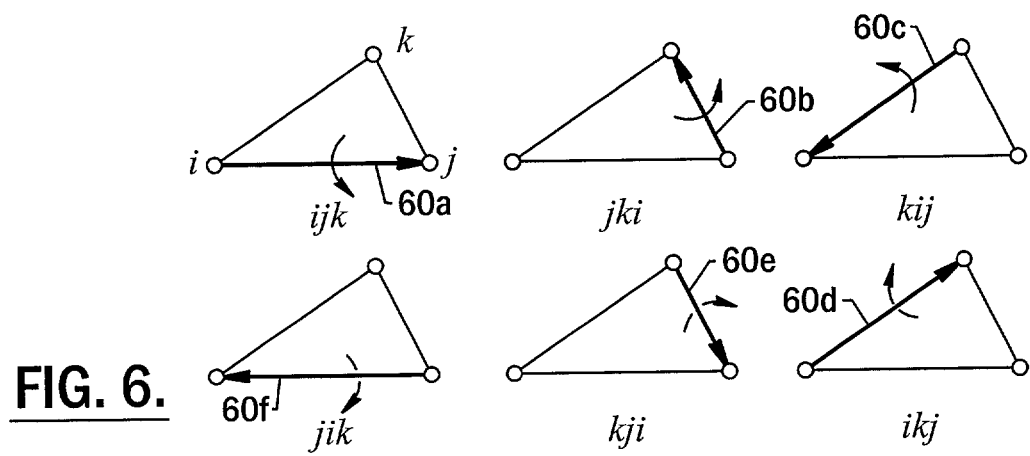
FIG. 6 illustrates a trist data structure comprising an array of (unordered) triangles connected to each other by adjacency.

The trist data structure is an array of (unordered) triangles connected to each other by adjacency. In the operation C2, each unordered triangle with vertices $p_i$, $p_j$, and $p_k$ is represented by its six ordered versions. As illustrated by FIG. 6, each ordered version of an unordered triangle stores a pointer fnext to the next triangle in the ring around the directed edge 60a–60f identified by the first two vertices in the ordering. By construction, each edge belongs to at most two triangles, which implies that three of the six fnext pointers are redundant. We find matching pairs of triangles by sorting the 3f (unordered) edges of the f triangles in F using the radix sort operation. Let $E_2$ be the list of edges obtained after removing the ones that occur only once. In this list, we represent each edge by the ordered pair of vertex indices, ij with i<j, and a tri pointer to the triangle responsible for its existence in $E_2$. The triangles are finally matched by scanning $E_2$. If $2e_2$ is defined as the length of $E_2$, then the following operations can be performed to match up all triangles:

for l=1 to $e_2$ do
        CONNECT ($E_2$[2 l−1].tri,$E_2$[2 l].tri)
    endfor.

Figure 7:
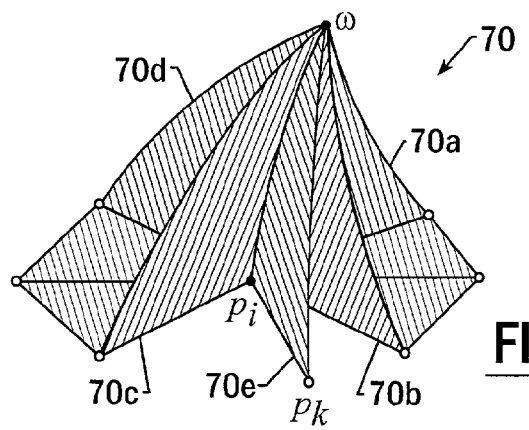
FIG. 7 illustrates five dummy triangles, four of which connect ω to boundary edges and one of which connects ω to a principal edge in a star of $p_i$.

Besides the edges that are shared by two triangles, boundary edges are provided in the resulting pseudomanifold. For each boundary edge $p_ip_j$, a triangle $p_ip_j\omega$ is constructed, where $\omega$ is a new dummy vertex. The dummy triangles 70 connecting $\omega$ to boundary edges are illustrated in FIG. 7. In particular, FIG. 7 illustrates five dummy triangles 70a–70e, four of which (i.e., 70a–70d) connect $\omega$ to boundary edges and one of which (i.e., 70e) connects $\omega$ to a principal edge in the star of $p_i$. The boundary edges are exactly the ones removed from $E_2$. Assuming the boundary edges are collected in another list, $E_1$, the dummy triangles are constructed in a single scan, as illustrated by the below operations:

for l=1 to $e_1$ do
        let ij be the index pair in $E_1$[l];
        create $p_ip_j\omega$; CONNECT ($E_1$[l].tri, $p_ip_j\omega$)
    endfor.

The operations C3 include adding principal edges. In these operations, all edges that belong to the stars of both their endpoints are accepted as members of the pseudomanifold. The edges that belong to one or two accepted triangles are already part of the pseudomanifold, but the principal edges that belong to no accepted triangles need to be added. Each principal edge $p_ip_k$ is represented by the dummy triangle $p_ip_k\omega$ shown as dummy triangle 70e in FIG. 7. All principal edges are found by radix sorting the edges in the collection of stars constructed in accordance with operations B3. The edges that are not in duplicate are removed along with edges that are in $E_1$ or in $E_2$. The resulting list, $E_0$, stores all principal edges. Similar to the boundary edges, the principal edges are added to the pseudomanifold in a single scan, as illustrated by the following operations:

for l=1 to $e_0$ do
        let ij be the index pair in $E_0$[l]; create $p_ip_j\omega$
    endfor.

Figure 8:
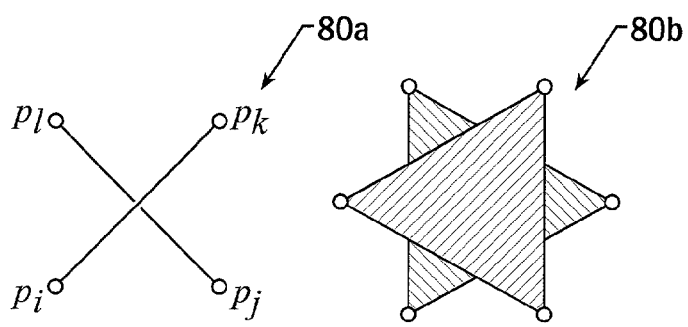
FIG. 8 illustrates two 'crossing' principal edges and two 'crossing' triangles.

It is possible that a problematic case of two 'crossing' principal edges may occur. For example, if $p_i$, $p_j$, $p_k$ and $p_l$ form a square, then the distortions caused by the projections of these points into four estimated tangent planes may create a contradictory agreement between diagonally opposing vertices. This is shown by FIG. 8, where two 'crossing' principal edges 80a are shown on the left. As also shown on the right side of FIG. 8, a similarly problematic case may also occur between two accepted triangles 80b. The case of 'crossing' edges can be avoided relatively inexpensively by prohibiting the occurrence of a principal edge $p_ip_k$ for which the two neighboring edges $p_ip_j$ and $p_ip_l$ in the star of $p_i$ are connected by another principal edge, namely $p_jp_l$. Such cases are again found using a radix sort operation and the involved edges are removed from $E_0$ before they can be added to the pseudomanifold.

Operations C4 to establish order and to add the remaining edges to the triangulation of the pseudomanifold will now be described. As described above, each star St $p_i$ is represented by a list storing the vertices on the boundary in order. These lists are used to connect the dummy triangles to each other. First, boundary and principal edges in the star are identified. Each boundary edge either starts or ends a hole when the star is read in a counterclockwise order. By definition, a principal edge both ends a hole and starts a new one. The buckets B[1 . . . n] are used again. The operations include storing in B[i] all indices k of vertices that define dummy triangles $p_ip_k\omega$. The buckets are sorted using quicksort, as described above, and each index is stored with a pointer to the corresponding dummy triangle. A given vertex index j can be located in B[i] using a binary search operation. If j∈B[i], then $p_ip_j$ is either a boundary edge that starts a hole, a boundary edge that ends a hole, or a principal edge. The identity of $p_ip_j$ can be determined by checking the non-null fnext pointers of the dummy triangle $p_ip_j\omega$, if any. The boolean operations STARTS and ENDS can be used to express the test. The function FIRST, is also used to return the first vertex in the i-th star, and the function NEXT$_i$ is used to return the next vertex that defines a boundary or principal edge. After passing the last such vertex, function NEXT$_i$ returns null. To reduce the disk and half-disk cases to one, the first vertex of a half-disk is repeated at the end of the list, making it appear as a disk. These operations are described by the following operations:

for i=1 to n do $p_j$=FIRST$_i$;
        repeat $p_k$=NEXT$_i$;
            if STARTS($p_j$) then assert ENDS($p_k$);
                CONNECT ($p_ip_j\omega$, $p_ip_k\omega$);
            endif; $p_j$=$p_k$
        until $p_k$=null
    endfor.

The most time-consuming part of these operations is the classification of edges, which is done using a binary search of the sorted lists B[i]. The lengths of these lists is bounded from above by the constant $k_0$−1, which implies that searching takes only constant time. The order among the dummy triangles is thus established in a time proportional to the number of edges.

Post-processing operations to identify and fill holes, identified above as stage D, include multiple sub-operations that will now be described. Holes in a pseudomanifold may be caused by missing data or by conflicts between vertex stars. The operations described hereinbelow can be used to fill small and simple holes automatically, but large or complicated holes are typically left to a user to manually fill. The operations to fill holes include:

(D1) Finding holes by identifying boundary cycles;
    (D2) Accepting holes that can be filled automatically; and
    (D3) Filling accepted holes with triangulated polygons.

Operations to determine boundary cycles can be performed efficiently because the vertex stars are ordered. However, testing whether or not a boundary cycle (e.g., hole) can be filled automatically is typically a more complex operation and may depend on the type of shape being reconstructed and the application to which the reconstructed surface is to be applied. A few conservative heuristics can be used to determine whether or not a boundary cycle may be filled automatically. The complexity of the hole filling operations is typically proportional to the size of the hole to be filled.

Operations D1 for identifying boundaries include using the classification of edges as principal, boundary, or interior edges, as described above. Each boundary edge $p_ip_j$ starts a hole in the star of one endpoint and ends a hole in the star of the other endpoint. A directed graph H is constructed that represents each principal edge $p_ip_j$ in K by its two directed versions, $p_ip_j$ and $p_jp_i$, and each boundary edge that starts a hole in St $p_i$ and ends one in St $p_j$ as the directed edge $p_ip_j$. Stated alternatively, the directed graph H is a directed version of the link of ω in K. The set of directed edges in H can be partitioned into directed cycles and the boundary cycles are identified as respective directed cycles. Let $\omega p_ip_j$ be a triangle in the star of ω such that $p_ip_j$ is a directed edge in H. The cycle that contains $p_ip_j$ can be traced by following fnext pointers. Function APPEND adds a new edge at the end of a list representing the traced cycle, as illustrated by the following operations:

while $p_ip_j$ is unmarked do
    APPEND $(p_ip_j)$; mark $p_ip_j$; $\omega p_ip_j=\omega p_jp_i$.fnext
endwhile.

Figure 9:
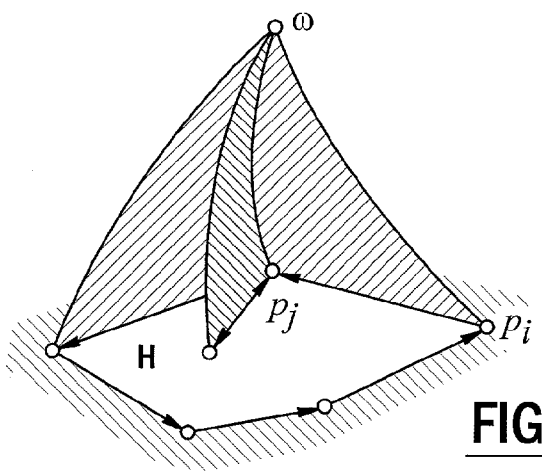
FIG. 9 illustrates a hole whose cycle of seven directed edges includes two along a principal edge of a pseudomanifold.

Observe the permutation $\omega p_jp_i$ of $\omega p_ip_j$ used to indicate a different ordered version of the triangle. As illustrated in FIG. 9, the cycles are traced such that the holes lie locally to the left of the directed edges. We trace cycles until all directed edges in H are marked.

The operations D2 include accepting holes that can be filled automatically, which typically includes only relatively small and simple holes. The size of the holes can be measured either geometrically, as the length or the diameter, or combinatorially, as the number of directed edges of the boundary cycle. The size of the holes can be distinguished by introducing a size threshold. However, the distinction between simple and complicated holes is more intricate. A hole may be treated as a "simple" hole if its boundary cycle can be embedded in a plane.

Figure 10:
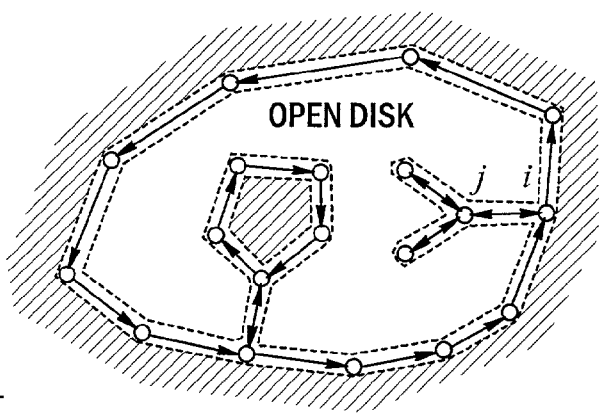
FIG. 10 illustrates an embedding of a directed boundary cycle that cuts a plane into an open disk on its left and one or more shaded open regions on its rights.

Because of the nature of the operations used in the construction of a cycle, its embedding surrounds an open disk on its left, as shown in FIG. 10. This open disk represents the hole to be filled. The indices of the vertices that are encountered when a boundary cycle is traversed can be recorded. A single vertex may occur an arbitrary number of times, but an alternation of the form . . . i . . . j . . . i . . . j . . . is not possible. Thus, a proper boundary cycle is a Davenport-Schinzel cycle of order at most two. This can be illustrated simply by taking a circle and marking four points with alternating labels, i, j, i, j. The point i is then connected to point i by a path outside the circle. Similarly, the point j is connected to j by a path outside the circle. As long as the paths are drawn in general position, they will cross an odd number of times. The circle is then deformed into a boundary cycle so that the ends of each path become the same and the paths become closed curves. However, two closed curves in general position necessarily cross an even number of times, which is a contradiction.

An operation is used that decides whether or not a cycle Z of indices contains a forbidden alternation between two indices, i and j. It is convenient to cut Z open to form a sequence. A forbidden alternation defines two intervals, one from i to i and the other from j to j, that overlap but neither is contained in the other. Two intervals with this property are independent. In the first pass, the operation computes all intervals between contiguous occurrences of the same index. Each interval is represented by having its endpoints point to each other. In the second pass, the cycle Z is scanned to see whether there is an independent pair of intervals. If the sequence is stored in an array Z[1 . . . m], each location l stores the index of a vertex, the left endpoint l− of the interval that ends at l, and the right endpoint l+ of the interval that starts at l. Both are positions in Z and the value zero is used to represent the non-existence of such endpoints. The operations, which maintain an initially empty stack of currently enclosing intervals, are described by the following operations:

boolean isSIMPLE (Z)
  for l=1 to m do
    if l−≠0 then [a, b]=POP;
      if [a, b]≠[l−, l] then return FALSE endif
    endif;
    if l+≠0 then PUSH ([l, l+]) endif
  endfor; return TRUE.

Function isSIMPLE is correct because if all intervals are either disjoint or nested, then the last interval pushed on the stack is the first one to be popped. The running time is proportional to the length of the cycle.

Operations D3 for triangulating holes will now be described. As holes get larger and more complicated, filling operations that get progressively more sophisticated are required. However, if only simple holes are considered, the operations may be efficiently performed. These hole filling operations create no new vertices and fill a hole with edges and triangles connecting the boundary cycle, Z. By restricting the operations to simple holes, these filling edges and triangles form the triangulation of a disk whose dual graph is a tree. The triangles that correspond to leaves can be referred to as ears. If Z has m>3 edges, then there are at least two ears. The triangulation can thus be built by adding an ear at a time. More precisely, the operations find two consecutive edges $p_ip_j$ and $p_jp_k$ in Z, add the triangle $p_ip_jp_k$ and the edge $p_ip_k$ to K, and substitute $p_ip_k$ for $p_ip_j$, $p_jp_k$ in Z. To produce a reasonable triangulation, the ears are prioritized by the angle at the middle vertex, $p_j$. Because the hole lies locally to the left of $p_ip_j$, $p_jp_k$, the angle on that side in the projection is measured onto the estimated tangent plane. To avoid duplications, edges $p_ip_k$ that are already part of the triangulation surrounding the hole are rejected. The operations use a priority queue for the edge pairs, which can be manipulated using the functions MINEXTRACT and CHANGEKEY (where $p_j-$ and $p_j+$ are used to represent the predecessor and successor of $p_j$ in Z):

while m>3 do $p_j$=MINEXTRACT;
  if not INK $(p_j-, p_j+)$ then
    add $p_j-p_jp_j+$ and $p_j-p_j+$ to K;
    CHANGEKEY$^2$ $(p_j-, p_j+)$; m=m−1
  endif
endwhile;
$p_j$=MINEXTRACT; add $p_j-p_jp_j+$ to K.

The running time for filling a hole bounded by a cycle with m edges is O(m log m).

The above-described operations for creating and merging stars will now be more fully described with respect to FIGS. 11–14. In particular, FIG. 11 illustrates a small set of points, including $p_1$ and $p_2$, that define a portion of a three-dimensional (3D) surface. In FIG. 12A, a first set of near points $S_1$ associated with the first point $p_1$ and a second set of near points $S_2$ associated with the second point $p_2$ are projected to respective tangent planes, shown as T1 and T2. The first set of near points $S_1$ and the second set of near points $S_2$ typically contain some points that are common to both sets. In the tangent plane T1, the projection of the first point, $p_1'$, represents the starting point $q_0$ for creating the star of $p_1'$. Similarly, in the tangent plane T2, the projection of the second point, $p_2'$, represents the starting point $q_0$ for creating the star of $p_2'$. Referring now to FIG. 12B, the first triangle in the star of $p_1'$ is created by connecting the starting point $q_0$ to the nearest point in the tangent plane T1, shown as point $q_1$, by an edge. Then, continuing in a counter-clockwise direction relative to the edge $q_0q_1$, the starting point $q_0$ is connected to the next closest point, shown as $q_2$. The points $q_1$ and $q_2$ are also connected by an edge to thereby define the first triangle $q_0q_1q_2$. The next nearest point in the counter-clockwise direction, $q_3$, is then identified. Referring now to FIG. 12C, an evaluation is then made to determine whether the point $q_3$ is within a circumcircle of the first triangle $q_0q_1q_2$, which is defined as a circle that passes through the vertices of the first triangle. If the point $q_3$ is within a circumcircle of the first triangle $q_0q_1q_2$, then the point $q_3$ is added as a vertex of a triangle in the star of $p_1'=q_0$ and the point $q_2$ is discarded. As illustrated by FIG. 12D, the sequence of operations illustrated by FIGS. 12B–12C are repeated until the star of $p_1'$, which frequently has about six (6) triangles, is fully defined as an open disk or open half-disk.

Referring again to FIG. 12B, the first triangle in the star of $p_2'$ is created by connecting the starting point $q_0$ to the nearest point in the tangent plane T2, shown as point $q_1$, by an edge. Then, continuing in a counter-clockwise direction relative to the edge $q_0q_1$, the starting point $q_0$ is connected to the next closest point, shown as $q_2$. The points $q_1$ and $q_2$ are also connected by an edge to thereby define the first triangle $q_0q_1q_2$. The next nearest point in the counter-clockwise direction, $q_3$, is then identified. An evaluation is then made to determine whether the point $q_3$ in FIG. 12C is within a circumcircle of the first triangle $q_0q_1q_2$. If the point $q_3$ is outside a circumcircle of the first triangle $q_0q_1q_2$, then the point $q_3$ is added as a vertex of a new triangle in the star of $p_2'$ and the point $q_2$ is retained as a vertex. As illustrated by FIG. 12D, the sequence of operations illustrated by FIGS. 12B–12C are repeated until the star of $p_2'$ is fully defined.

As illustrated by FIG. 12D, two triangles A and B, which share a common edge, are illustrated with heavy shading. The triangle A in the first tangent plane T1 and the triangle A in the second tangent plane T2 have vertices that map to the same three points, including the first point $p_1$, in the point set illustrated by FIG. 11. Similarly, the triangle B in the first tangent plane T1 and the triangle B in the second tangent plane T2 map to the same three points, including the first point $p_1$, in the point set illustrated by FIG. 11. Accordingly, as illustrated by FIG. 13, the above-described edge and triangle sorting operations may be performed to merge the pair of triangles A together and merge the pair of triangles B together into a surface triangulation, containing the star of $p_1$ and the star of $p_2$.

Figure 14A:
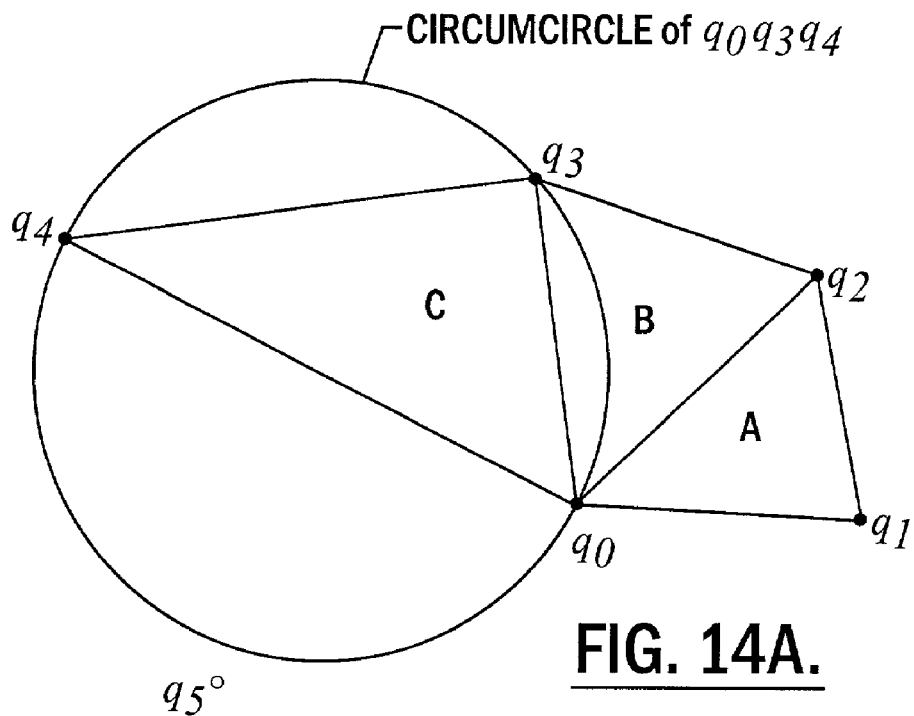
FIGS. 14A–14G illustrate operations to sequentially connect projected points according to embodiments of the present invention.
Figure 14B:
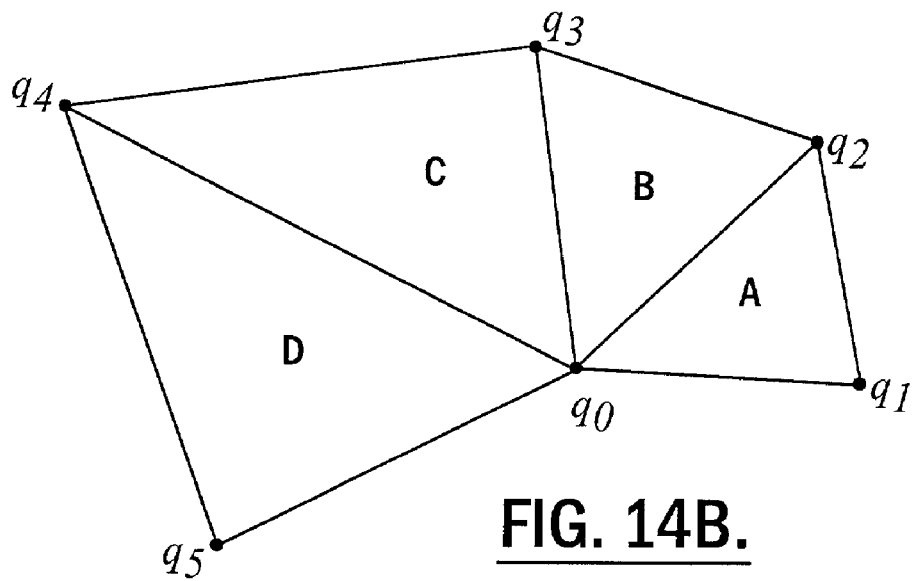
Figure 14C:
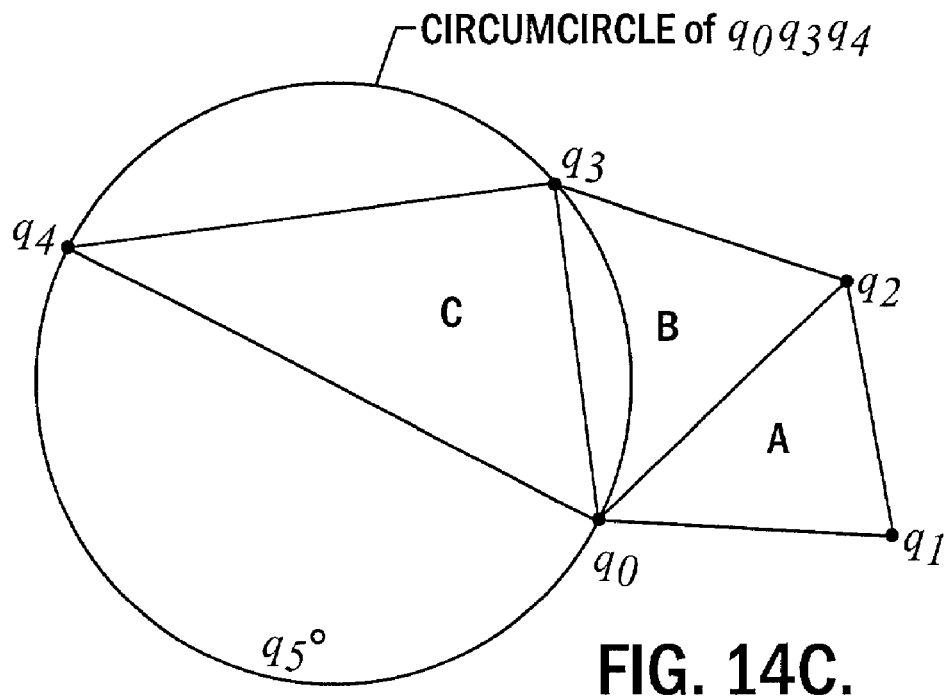
Figure 14D:
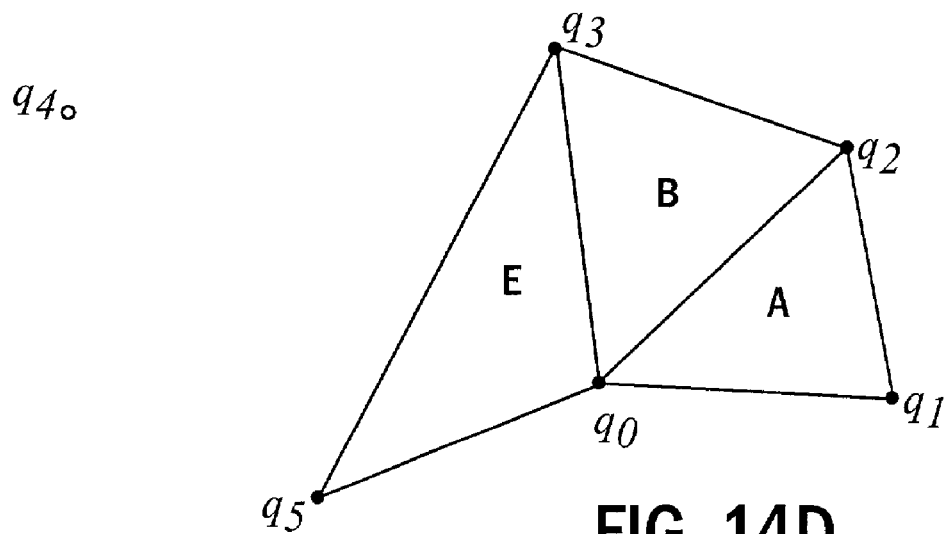

Preferred operations for creating stars from points projected to a plane will now be more fully described with respect to FIGS. 14A–14G. In particular, FIGS. 14A–14B illustrate operations that may be used to determine how the projected point $q_5$ is to be connected to other points in the star of $q_0$ as the star, which is shown as an open half-disk, is created. In FIGS. 14A–14B, the partial star of $q_0$ is expanded by evaluating whether the next point $q_5$ in the sequence of points $q_0, q_1, q_2, q_3, q_4, q_5, q_0$ is inside or outside a circumcircle of a triangle defined by the two immediately preceding vertices, $q_4$ and $q_3$, and vertex $q_0$. Because the next point $q_5$ in the sequence is outside the illustrated circumcircle, the triangle $q_0q_4q_5$, illustrated as triangle D, is added and the star of $q_0$ is defined by triangles A–D. However, in FIG. 14C, the next point $q_5$ in the sequence of points $q_0, q_1, q_2, q_3, q_4, q_5, q_0$ is inside the circumcircle of $q_0q_3q_4$. Accordingly, the point $q_4$ is dropped from the sequence and the new triangle $q_0q_3q_5$ is added as a replacement for the triangle $q_0q_3q_4$. Thus, as illustrated by FIG. 14D, the star of $q_0$ is defined by triangles A–B and E.

Figure 14E:
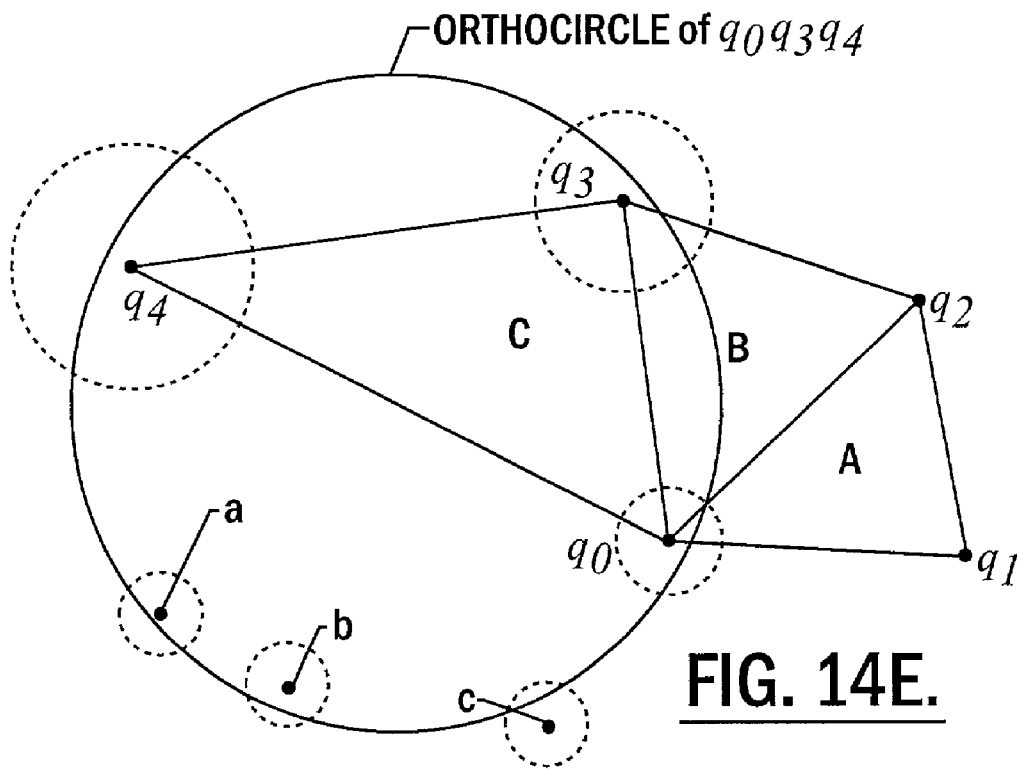

Referring now to FIG. 14E, the introduction of projection weights adds complexity to the operations for determining whether a next projected point in a sequence $q_0q_1q_2q_3 \ldots q_r q_0$ is to be added as a vertex of a new triangle. When projection weights are considered, the preferred operations include determining whether or not the next projected point in the sequence, illustrated as points "a", "b" or "c", is closer than orthogonal to an orthocenter of an orthocircle of triangle $q_0q_3q_4$, where each of the vertices $q_0$, $q_3$ and $q_4$ of the triangle $q_0q_3q_4$ has respective non-zero weights associated therewith that are function of projection distance (e.g., proportional to (projection distance)$^2$). The magnitude of each respective weight is illustrated as proportional to a radius of a circle surrounding a respective point. As illustrated by FIG. 14E, each of the weighted points "a" and "b" appear to be closer than orthogonal (c.t.o) and point "c" appears to be farther than orthogonal (f.t.o). To determine conclusively whether or not a respective point is closer than orthogonal, the value of the det Λ can be determined for each weighted point to be evaluated, as described more fully hereinabove. For each case where det Λ<0, the weighted point t is treated as being closer than orthogonal to the orthocenter of the triangle qrs and for each case where det Λ>0, the weighted point t is treated as being farther than orthogonal. As described more fully in section 1.4 of the aforementioned textbook to H. Edelsbrunner, a geometric technique of symbolically perturbing a geometric input can be used advantageously to preclude inconsistencies in star building that may occur in cases where a weighted point is found to be orthogonal to the orthocenter (i.e., det Λ=0).

Figure 14F:
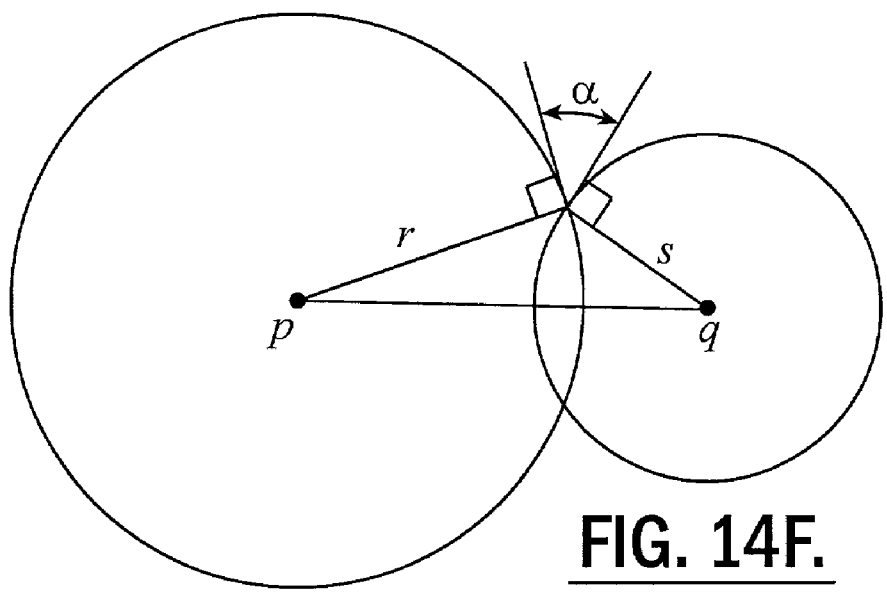
Figure 14G:
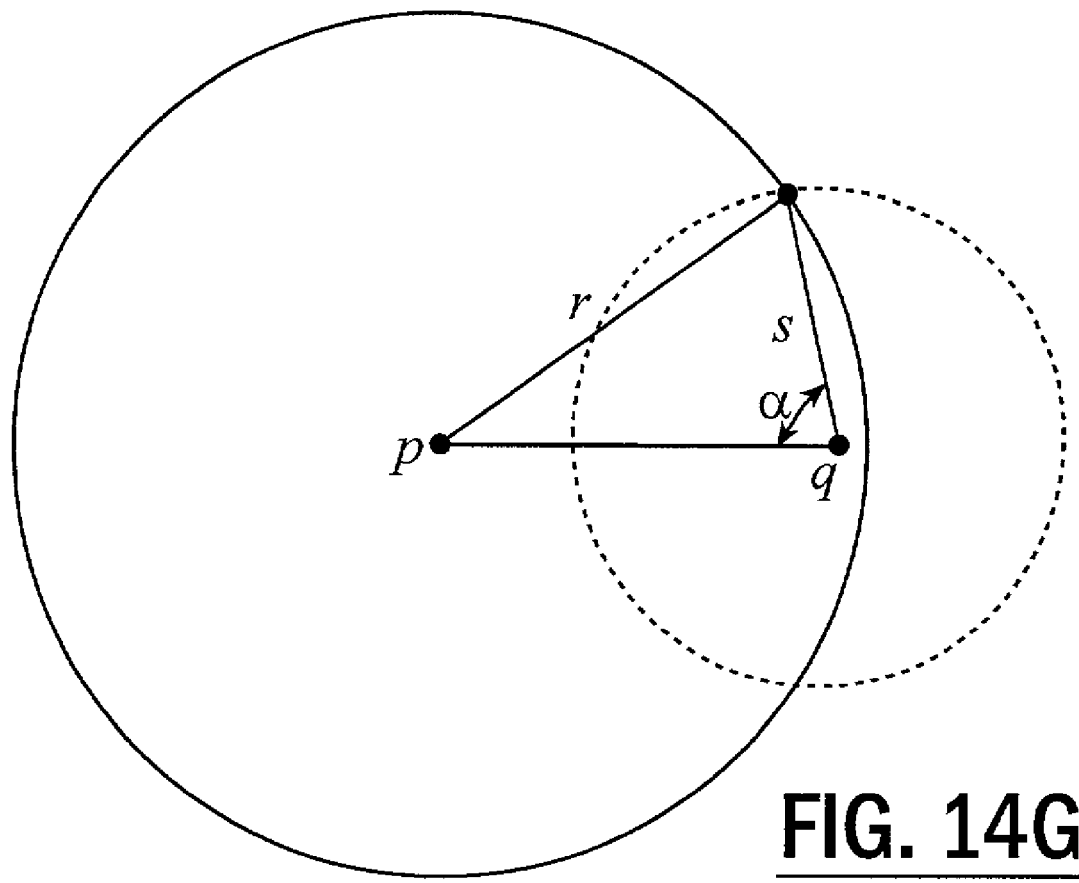

The operations for determining det Λ can be understood geometrically by considering the two cases illustrated by FIGS. 14F–14G, for two points p and q. In both cases, the point q is orthogonal to the orthocenter p if:

$$\|p-q\|^2 - r^2 - s^2 = 0$$

FIG. 14F illustrates the real-real case where ($r^2$, $s^2$>0). In this case, the exterior angle α extending between the tangents to the circles surrounding points p and q (at the point of intersection between the two circles) can be evaluated to determine whether or not point q is closer than orthogonal to the orthocenter p, as shown by the following relationship:

$$\alpha \begin{cases} < 90° & f.t.o \\ = 90° & orthogonal \\ > 90° & c.t.o \end{cases}$$

FIG. 14G illustrates the real-imaginary case where ($r^2$>0, $s^2$<0). In this case, the interior angle α can be evaluated in accordance with the above relationships to determine whether or not point q is closer than orthogonal to the orthocenter p. The real-imaginary case presents the possibility of having a point q that is physically within an orthocircle centered about the orthocenter p, but is nonetheless farther than orthogonal to the orthocenter.

Figure 15:
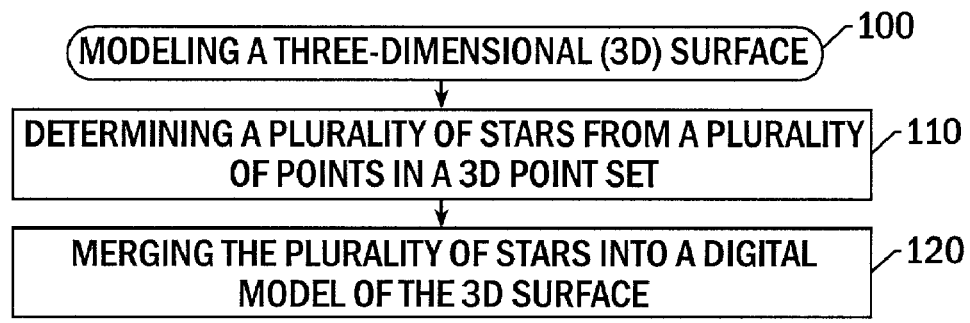
FIG. 15 is a flow-diagram that illustrates operations for modeling three-dimensional surfaces according to embodiments of the present invention.
Figure 16:
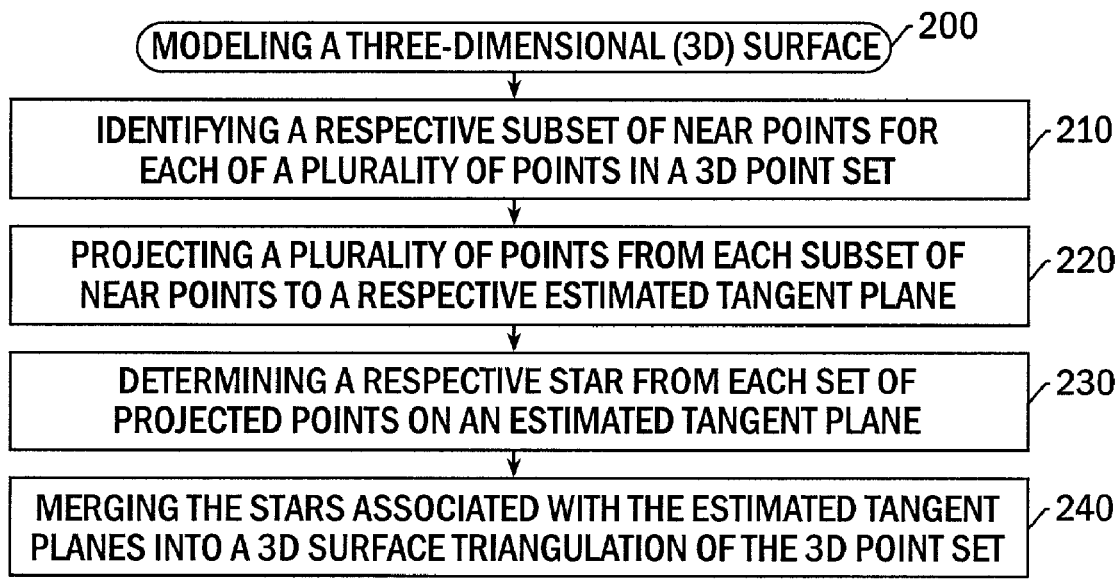
FIG. 16 is a flow-diagram that illustrates operations for modeling three-dimensional surfaces according to embodiments of the present invention.

Referring now to FIG. 15, preferred high-level operations 100 for modeling a three-dimensional (3D) surface include determining a plurality of stars from a plurality of points in a 3D point set that at least partially describes the 3D surface, Block 110, and then merging the plurality of stars into a digital model of the 3D surface, Block 120. The operations 100 may be performed by a plurality of embodiments. In particular, FIG. 16 illustrates operations 200 for modeling a 3D surface that include identifying a subset of near points for each of a plurality of points in a 3D point set, Block 210. This 3D point set may take the form of a point cloud data file, with each data point being identified by its Cartesian coordinates. The point cloud data file need not possess connectivity information that links or defines relationships between respective points therein. The point cloud data files may be provided in an ASCII xyz data format by conventional digitizers, including those manufactured by Cyberware™, Digibotics™, Laser Design™, Steinbichler™, Genex™ and Minolta™, for example. The data files may describe 3D surfaces that are closed. As will be understood by those skilled in the art of three-dimensional geometry, all closed 3D surfaces are either star-shaped or non star-shaped. Closed surfaces are "star" shaped if and only if there exists at least one point on the interior of the volume bounded by the closed surface from which all points on the surface are visible. All other surfaces are non star-shaped. Examples of star-shaped surfaces include a cube, a sphere and tetrahedron. Examples of non star-shaped surfaces include toroids (e.g, donut-shaped) and closed surfaces having tunnels and handles.

Figure 17:
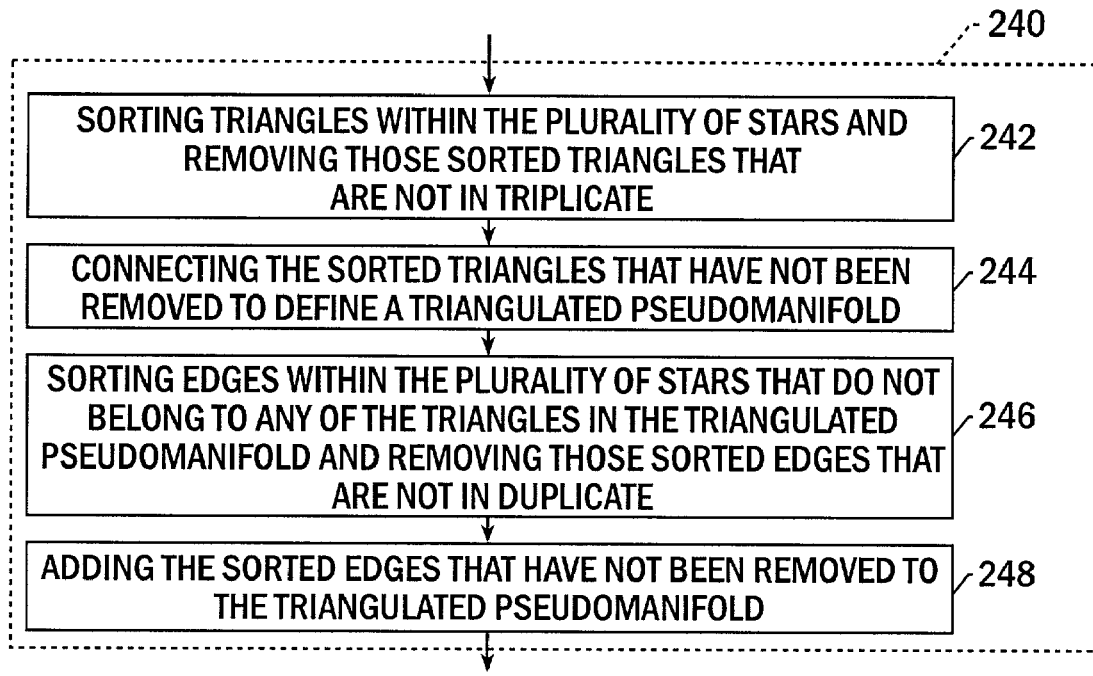
FIG. 17 is a flow-diagram that illustrates preferred operations for merging stars according to embodiments of the present invention.

The operations 200 of FIG. 16 also include projecting a plurality of points from each subset of near points to a respective estimated tangent plane, Block 220, and then determining a respective star from each set of projected points on an estimated tangent plane, Block 230. As described above, the operations to determine a star from a set of projected points preferably includes assigning weights based on projection distance to at least a plurality of the projected points and using these weights to determine whether a projected point is to be a vertex of a triangle within the star or is to be discarded. The stars associated with each of a plurality of tangent planes are then merged into a 3D surface triangulation of the 3D point set, Block 240. As illustrated by FIG. 17, these operations to merge stars, Block 240, preferably include sorting triangles within the plurality of stars and removing those sorted triangles that are not in triplicate, Block 242. The remaining triangles that are not removed are then connected to define a triangulated pseudomanifold, Block 244. Operations may also be performed to sort those edges within the plurality of stars that do not belong to any of the triangles in the triangulated pseudomanifold, and remove those sorted edges that are not in duplicate, Block 246. The remaining edges that have not been removed are then added to the triangulated pseudomanifold, Block 248.

Figure 18:
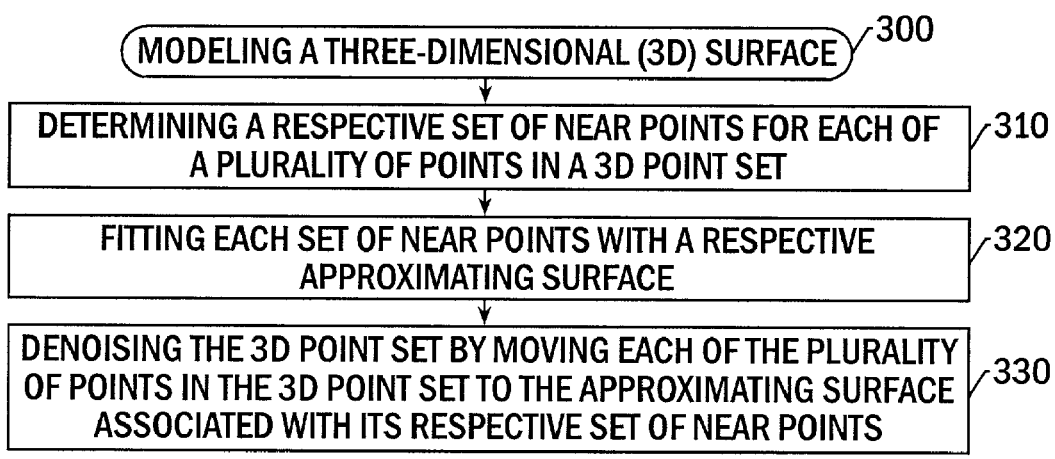
FIG. 18 is a flow-diagram that illustrates operations for preprocessing three-dimensional point sets to reduce noise, according to embodiments of the present invention.

Preferred operations 300 to model 3D surfaces may also include preprocessing operations that improve the quality of the 3D point set by, among other things, reducing noise and removing outliers, as illustrated by FIG. 18. The preprocessing operations may include determining a respective set of near points for each of a plurality of points in a 3D point set, Block 310, and then fitting each set of near points with a respective approximating surface, Block 320. A denoising operation may then be performed by moving each of the plurality of points in the 3D point set to the approximating surface that is associated with its respective set of near points, Block 330.

Figure 19:
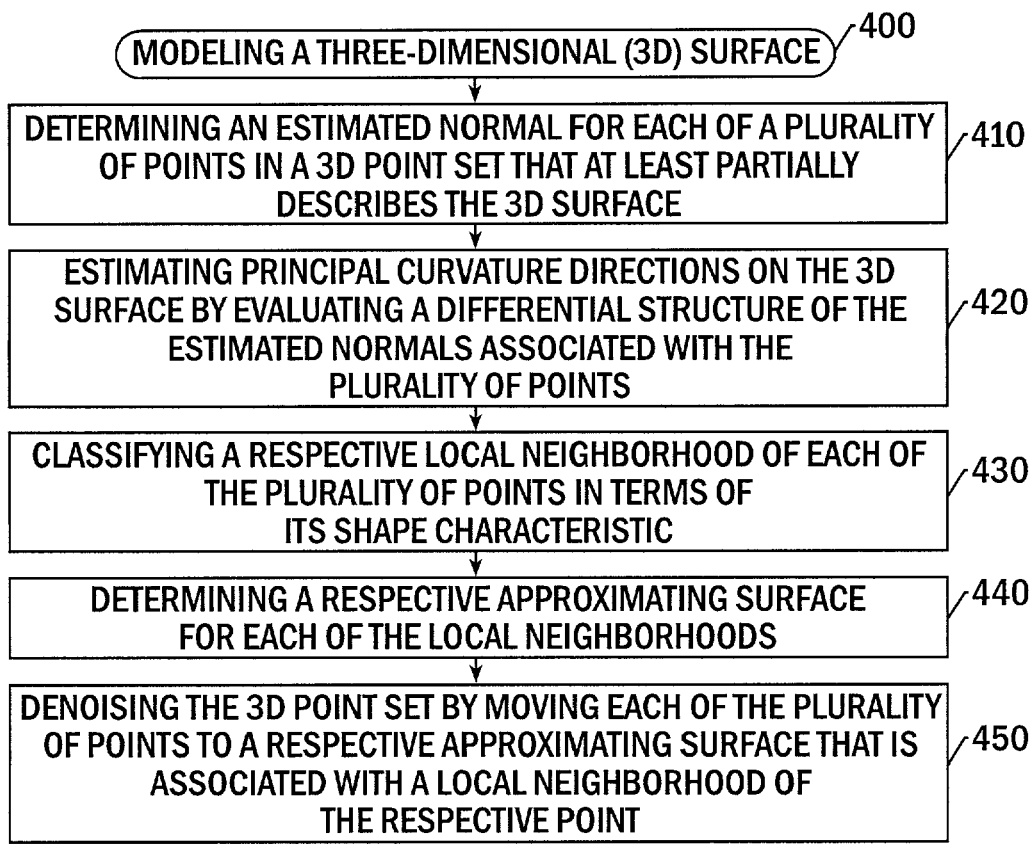
FIG. 19 is a flow-diagram that illustrates operations for preprocessing three-dimensional point sets to reduce noise, according to embodiments of the present invention.

More detailed embodiments of these preprocessing operations are illustrated by FIG. 19. In particular, operations 400 to model 3D surfaces may include determining an estimated normal for each of a plurality of points in a 3D point set that at least partially describes the 3D surface, Block 410, and then estimating principal curvature directions on the 3D surface by evaluating a differential structure of the estimated normals associated with the plurality of points, Block 420. A local neighborhood of each of the plurality of points is also classified in terms of its shape characteristic, Block 430. Based on its classification, an approximating surface is determined for each of the local neighborhoods, Block 440. The quality of the 3D point set is then improved by moving each of the plurality of points to a respective approximating surface that is associated with a local neighborhood of the respective point, Block 450.

Figure 20:
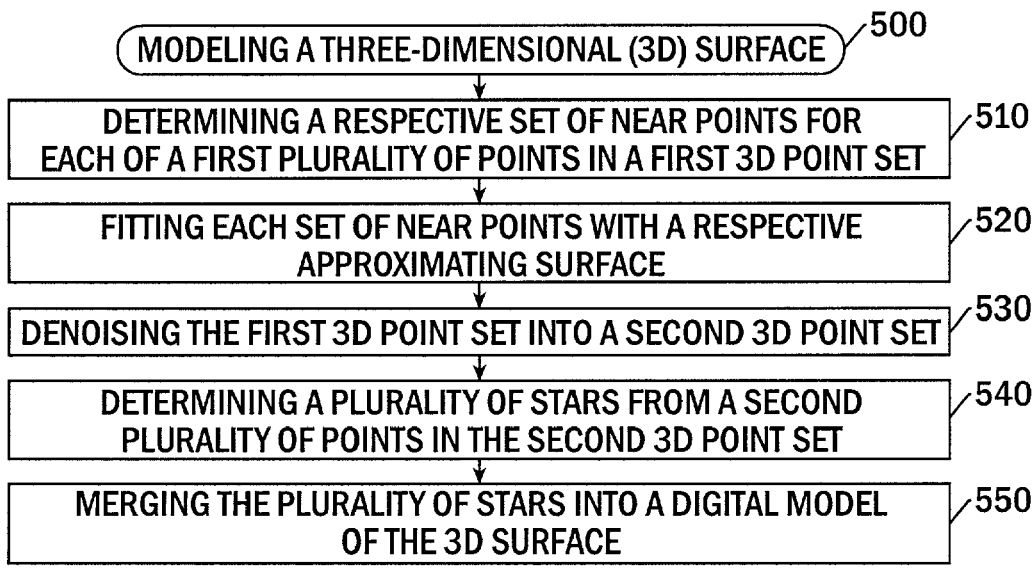
FIG. 20 is a flow-diagram that illustrates operations for modeling three-dimensional surfaces according to embodiments of the present invention.

Accordingly, the operations to model 3D surfaces may include operations to reduce noise within a 3D point set and then use the improved 3D point set to create and merge stars into a triangulated model of the 3D surface. Thus, as illustrated by FIG. 20, these modeling operations 500 may include determining a respective set of near points for each of a first plurality of points in a first 3D point set, Block 510, and then fitting each set of near points with a respective approximating surface, Block 520. An operation is then performed to generate a second 3D point set by denoising the first 3D point set, Block 530. Operations are then performed to determine a plurality stars from a second plurality of points in the second 3D point set, Block 540. The stars are then merged into a digital model of the 3D surface using preferred sorting and removal operations, Block 550.

Figure 21:
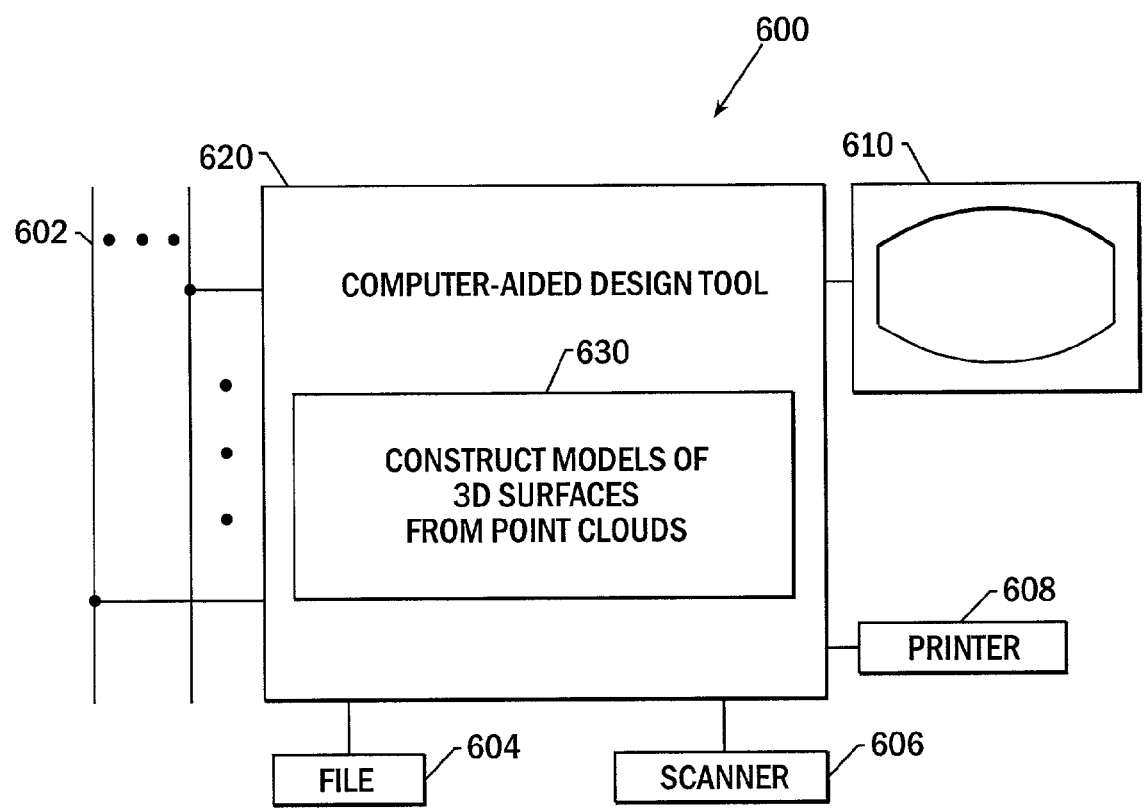
FIG. 21 is a block diagram that illustrates a general hardware description of a computer workstation that performs operations according to embodiments of the present invention.

Referring now to FIG. 21, a general hardware description of a custom CAD/CAM workstation 600 is illustrated as comprising, among other things, software and hardware components that perform the operations described above, including those illustrated by FIGS. 15–20. The workstation 600 preferably includes a computer-aided design tool 620 that may accept a point cloud data set via a file 604, a scanner 606, data bus 602 or other conventional means. A display 610 and a three-dimensional printer 608 are also preferably provided to assist in performing the operations of the present invention. The hardware design of the above described components 604, 606, 608 and 610 is well known to those having skill in the art and need not be described further herein. The workstation 600 preferably comprises a computer-readable storage medium having computer-readable program code embodied in the medium. This computer-readable program code is readable by one or more processors within the workstation 600 and tangibly embodies a program of instructions executable by the processor to perform the operations described herein.

In the drawings and specification, there have been disclosed typical preferred embodiments of the invention and, although specific terms are employed, they are used in a generic and descriptive sense only and not for purposes of limitation, the scope of the invention being set forth in the following claims. These claims include method, apparatus and computer program product claims. The method claims include recitations that may also be provided as recitations within apparatus and computer program product claims. In particular, the method claims may recite steps that can be treated as operations performed by apparatus and/or instructions and program code associated with computer program products.

That which is claimed is:

1. A method of modeling a three-dimensional (3D) surface, comprising the steps of:
   determining a plurality of stars from a plurality of points $p_i$ in a 3D point set S that at least partially describes the 3D surface, by projecting the plurality of points $p_i$ onto planes $T_i$ that are each estimated to be tangent about a respective one of the plurality of points $p_i$; and
   merging the plurality of stars into a digital model of the 3D surface.

2. The method of claim 1, wherein said determining step comprises identifying a respective subset of near points $S_i$ for each of the plurality of points $p_i$.

3. The method of claim 2, wherein said determining step comprises projecting a plurality of points $p_j$ in each subset of near points $S_i$ to a respective estimated tangent plane $T_i$.

4. The method of claim 3, wherein said determining step comprises determining for each of a plurality of estimated tangent planes, $T_j$, a star of the projection of a respective point $p_i$ onto the estimated tangent plane $T_i$.

5. The method of claim 4, wherein the star of the projection of a respective point $p_i$ onto the estimated tangent plane $T_i$ constitutes a two-dimensional (2D) Delaunay triangulation.

6. The method of claim 4, wherein the star of the projection of a respective point $p_i$ onto the estimated tangent plane $T_i$ constitutes a two-dimensional (2D) weighted Delaunay triangulation.

7. The method of claim 6, wherein a distance between at least one point $p_i$ and its orthogonal projection onto a respective estimated tangent plane $T_i$ is non-zero.

8. The method of claim 1, wherein said determining step comprises identifying a respective subset of near points $S_i$ for each of the plurality of points $p_i$ by storing the 3D point set S in an oct-tree.

9. The method of claim 2, where:

$S_i = \Box_i(r_0) \cap N_i(k_0)$, and $\Box_i(r_0)$ is defined as the set of points $p_j \in S$ with an $l_\infty$-distance at most $r_0$ from $p_i$ and $N_i(k_0)$ is the set of $k_0$ points that are closest in Euclidean distance to $p_i$, including $p_i$ itself, and $k_0$ is a positive integer.

10. The method of claim 1, wherein said determining step comprises identifying a respective subset of near points $S_i$ for each of the plurality of points $p_i$ by determining a width of a near point search cube using a random sample $R \subseteq S$ and identifying those points in S that are within a respective near point search cube that is centered about each of the plurality of points $p_i$.

11. The method of claim 1, wherein said determining step comprises identifying a respective subset of near points $S_i$ for each of the plurality of points $p_i$ by:
    storing the 3D point set S in an oct-tree;
    determining a width $2r_0$ of a near point search cube using a random sample $R \subseteq S$, where $r_0$ is a positive real number; and then, for each of the plurality of points $p_i$, determining a subset of $k_0$ points that are closest in Euclidean distance to $p_i$ and selecting from the subset all points that are also within a respective near point search cube that is centered about a corresponding point $p_i$ and has a width equal to $2r_0$, where $k_0$ is a positive integer.

12. The method of claim 1, wherein said determining step comprises identifying a respective subset of near points $S_i$ for each of the plurality of points $p_i$ by:
    storing the 3D point set S in an oct-tree;
    determining a width $2r_0$ of a near point search cube using a random sample $R \subseteq S$, where $r_0$ is a positive real number that equals a minimum value of r for which an average of a yield is greater than or equal to $m_0$, where $m_0$ is a positive constant and the yield equals the number of points in S that are within a near point search cube of width $2r$ centered about a respective point in the random sample R; and then, for each of the plurality of points $p_i$ in the 3D point set S,
    determining a subset of $k_0$ points that are closest in Euclidean distance to $p_i$ and selecting from the subset all points that are also within a respective near point search cube that is centered about a corresponding point $p_i$ and has a width equal to $2r_0$, where $k_0$ is a positive integer.

13. The method of claim 11, where $m_0$ is about equal to 100 and $k_0$ is about equal to 30.

14. A method of modeling a three-dimensional (3D) surface, comprising the steps of:
    determining a plurality of stars from a plurality of points $p_i$ in a 3D point set S that at least partially describes the 3D surface, by projecting each of the plurality of points $p_i$ onto a respective plane; and
    merging the plurality of stars into a model of the 3D surface by eliminating edges and triangles from the plurality of stars that are in conflict and merging nonconflicting edges and triangles from the plurality of stars into a 3D surface triangulation.

15. The method of claim 14, wherein said merging step comprises:
    sorting triangles within the plurality of stars and removing those sorted triangles that are not in triplicate;
    connecting the sorted triangles that have not been removed to define a triangulated pseudomanifold as a two-dimensional simplicial complex in which edges and triangles of a star that share a vertex form a portion of an open disk;
    sorting edges within the plurality of stars that do not belong to any of the triangles in the triangulated pseudomanifold and removing those sorted edges that are not in duplicate; and
    adding the sorted edges that have not been removed to the triangulated pseudomanifold.

16. The method of claim 14, wherein said merging step comprises:
    sorting triangles within the plurality of stars and removing those sorted triangles that are not in triplicate.

17. The method of claim 16, wherein said merging step further comprises:
    connecting the sorted triangles that have not been removed to define a triangulated pseudomanifold as a two-dimensional simplicial complex.

18. The method of claim 17, wherein said merging step further comprises:
    sorting edges within the plurality of stars that do not belong to any of the triangles in the triangulated pseudomanifold and removing those sorted edges that are not in duplicate; and
    adding the sorted edges that have not been removed to the triangulated pseudomanifold.

19. A method of modeling a three-dimensional (3D) surface, comprising the steps of:
    determining a plurality of triangulated neighborhoods from a plurality of points in a 3D point set that at least partially describes the 3D surface, by projecting each of the plurality of points and one or more neighboring points in the 3D point set to a respective plane; and
    merging the plurality of triangulated neighborhoods into a digital model of the 3D surface.

20. The method of claim 19, wherein said determining step comprises projecting each of the plurality of points and one or more neighboring points in the 3D point set to a respective tangent plane.

21. A method of modeling a surface of an object, comprising the steps of:
    projecting each point and corresponding set of one or more neighboring points in a point set to a respective plane;
    determining a star for each plane; and
    merging the stars into a surface triangulation.

22. The method of claim 21, wherein said projecting step comprises projecting each point and corresponding set of one or more neighboring points in a point set to a respective plane that is estimated to be tangent about the point.

23. The method of claim 21, wherein said step of determining a star for each plane comprises determining a star having vertices that are weighted as a function of projection distance for each plane.

24. A method of modeling a three-dimensional (3D) surface, comprising the steps of:
determining an estimated normal for each of a plurality of points in a 3D point set that at least partially describes the 3D surface;
evaluating a differential structure of the estimated normals associated with the plurality of points to estimate principal curvature directions on the 3D surface and classify a respective local neighborhood of each of the plurality of points in terms of its shape characteristic;
determining a respective approximating surface for each of the local neighborhoods; and
denoising the 3D point set by moving each of the plurality of points to a respective approximating surface that is associated with a local neighborhood of the respective point.

25. A method of modeling a three-dimensional (3D) surface, comprising the steps of:
determining a respective set of near points $S_i$ for each of a plurality of points $p_i$ in a 3D point set S that at least partially describes the 3D surface, where $S_i \subseteq S$;
determining a normal bundle for the 3D point set S by determining a respective plane $h_i$ of best fit for each of the sets of near points $S_i$ and a respective normal $n_i$ for each of the planes $h_i$ of best fit; and
determining a respective approximating surface for each of the sets of near points $S_i$ using the normal bundle to estimate respective principal curvature directions for each of the sets of near points $S_i$.

26. A method of modeling a three-dimensional (3D) surface, comprising the steps of:
determining a respective set of near points $S_i$ for each of a first plurality of points $p1_i$ in a first 3D point set S1 that at least partially describes the 3D surface, where $S_i \subseteq S1$;
fitting each set of near points $S_i$ with a respective approximating surface;
denoising the first 3D point set S1 into a second 3D point set S2 by moving at least some of the first plurality of points $p1_i$ in the first 3D point set S1 to the approximating surfaces associated with their respective sets of near points $S_i$;
determining a plurality of stars from a second plurality of points $p2_i$ in the second 3D point set S2, by projecting the second plurality of points $p2_i$ onto planes $T_i$ that are estimated to be tangent about a respective one of the second plurality of points $p2_i$; and
merging the plurality of stars into a digital model of the 3D surface.

27. The method of claim 26, wherein said step of fitting each set of near points $S_i$ with a respective approximating surface comprises fitting a first set of near points $S_1$ with a first approximating surface by:
determining respective planes $h_j$ of best fit for each of a plurality of points $p_j$ in the first set of near points $S_1$; and
determining an estimated normal $n_j$ for each of the points $p_j$ as a normal of its respective plane $h_j$ of best fit.

28. The method of claim 26, wherein said step of fitting each set of near points $S_i$ with a respective approximating surface comprises fitting a first set of near points $S_1$ with a first approximating surface by:
determining respective planes $h_j$ of best fit for each of a plurality of points $p_j$ in the first set of near points $S_1$;
determining an estimated normal $n_j$ for each of the points $p_j$ as a normal of its respective plane $h_j$ of best fit; and
classifying the first set of near points $S_1$ in terms of its shape characteristic, by determining estimates of principal curvature directions for a point $p1_i$ from a plurality of the estimated normals $n_j$.

29. The method of claim 26, wherein said step of fitting each set of near points $S_i$ with a respective approximating surface comprises classifying a shape characteristic of each set of near points $S_i$ as plane-like and/or edge-like and/or corner-like.

30. A method of modeling a three-dimensional (3D) surface, comprising the steps of:
determining a respective set of near points for each of a plurality of points in a 3D point set that at least partially describes the 3D surface;
fitting each set of near points with a respective approximating surface that is a selected from a group consisting of cylinders and quadratic and/or cubic surfaces; and
denoising the 3D point set by moving each of the plurality of points in the 3D point set to the approximating surface associated with its respective set of near points.

31. A method of modeling a three-dimensional (3D) surface, comprising the steps of:
determining a respective set of near points for each of a first plurality of points in a 3D point set that at least partially describes the 3D surface; and
determining an estimated normal for each of the first plurality of points by:
determining a respective plane of best fit for each of the sets of near points; and
determining a normal for each of the planes of best fit.

32. A method of modeling a three-dimensional (3D) surface, comprising the steps of:
determining a respective set of near points for each of a first plurality of points in a 3D point set that at least partially describes the 3D surface;
determining a normal bundle by determining a respective plane of best fit for each of the sets of near points and a normal for each of the planes of best fit; and
determining from the normal bundle at least one respective principal curvature direction for each of the sets of near points.

33. A method of modeling a three-dimensional (3D) surface, comprising the step of:
denoising a 3D point set that at least partially describes the 3D surface by:
classifying a first neighborhood of points in the 3D point set S1 using a mass distribution matrix of the first neighborhood of points to estimate first normals associated with the first neighborhood of points and a normal distribution matrix of the first normals to estimate principal curvature directions;
fitting an approximate surface, which is selected from a group consisting of cylindrical, quadratic and cubic surfaces, to the first neighborhood of points; and
moving at least one point in the first neighborhood of points to the approximate surface.

34. A method of modeling a three-dimensional (3D) surface, comprising the steps of:
identifying a respective subset of near points for each of a plurality of points in a 3D point set that at least partially describes the 3D surface by:

determining dimensions of a near point search space using a random sample of the 3D point set; and selecting, for each of the plurality of points, a respective set of points in the 3D point set that are within a respective near point search space that is oriented about a respective one of the plurality of points;

determining a plurality of stars from the plurality of points in the 3D point set by projecting the points in each subset of near points to a respective plane; and merging the plurality of stars into a digital model of the 3D surface.

35. The method of claim 34, wherein each near point search space comprises a space selected from the group consisting of cubes, elipsoids, spheres and parallelpipeds.

36. The method of claim 34, wherein said step of determining a plurality of stars comprises determining a plurality of stars from the plurality of points in the 3D point set by projecting the points in each subset of near points to a respective estimated tangent plane.

37. A method of reconstructing a surface of an object from a three-dimensional (3D) point cloud data set S derived from scanning the object, comprising the steps of:

determining a respective subset of near points $S_i \subseteq S$ for each of a plurality of points $p_i \in S$;

estimating a tangent plane $T_i$ for each subset of near points $S_i$;

projecting each subset of near points $S_i$ onto its respective tangent plane $T_i$;

constructing a respective star of each of the plurality of points $p_i$ from the projected points on each of the tangent planes $T_i$;

merging the stars associated with the tangent planes $T_i$ into a 3D model of the surface by eliminating edges and triangles from the stars that are in conflict and merging nonconflicting edges and triangles from the stars into a 3D surface triangulation; and filling one or more holes in the 3D surface triangulation.

38. A method of reconstructing a surface of an object from a three-dimensional dimensional (3D) point cloud, comprising the steps of:

determining for each of a first plurality of points in the point cloud a respective approximating surface that fits the point's neighborhood;

moving each of the first plurality of points to its respective approximating surface;

determining an estimated tangent plane for each of a second plurality of points that have been moved to a respective approximating surface;

projecting each of the second plurality of points and points in their respective neighborhoods to a respective one of the estimated tangent planes;

constructing stars from points projected to the estimated tangent planes; and merging the stars into a surface triangulation.

39. The method of claim 38, further comprising the step of filling one or more holes in the surface triangulation.

40. A method of reconstructing a surface of an object from a three-dimensional (3D) point cloud, comprising the steps of:

denoising the point cloud;

determining an estimated tangent plane for each of a plurality of points in the denoised point cloud;

projecting each of the plurality of points and other points in its respective neighborhood to a respective one of the estimated tangent planes;

constructing stars from points projected to the estimated tangent planes; and merging the stars into a surface triangulation.

41. The method of claim 40, further comprising the step of filling one or more holes in the surface triangulation by:

constructing a directed graph that represents each principal edge of the surface triangulation by its two directed versions and each boundary edge as a single directed edge; and identifying a boundary cycle of at least one hole by partitioning the directed graph into directed cycles.

42. The method of claim 41, wherein said step of identifying a boundary cycle is followed by the step of identifying simple holes.

43. The method of claim 42, wherein said step of identifying simple holes comprises identifying holes having index cycles that are Davenport-Schinzel cycles of order less than three.

44. A method of denoising a three-dimensional (3D) point set, comprising the steps of:

estimating directions of a local collection of normals associated with a local collection of data points in the 3D point set by determining eigenvectors of a mass distribution matrix of the local collection of data points; and estimating directions of curvature associated with the local collection of data points by determining eigenvectors of a normal distribution matrix of the local collection of normals.

45. A method of modeling a three-dimensional (3D) surface, comprising the steps of:

moving each of a plurality of first points in a point set that at least partially describes the 3D surface to a respective approximating surface that is derived by evaluating a respective first point and a plurality of its neighboring points in the point set;

projecting at least one of the first points, which has been moved to an approximating surface, to a first plane that is estimated to be tangent about the at least one of the first points;

projecting a plurality of points in a neighborhood of the at least one of the first points to the first plane; and generating a star from a plurality of projected points on the first plane.

46. A method of modeling a three-dimensional (3D) surface, comprising the step of:

determining a star of a first point in a 3D point set that at least partially describes the 3D surface, by:

projecting the first point and second, third and fourth points in a neighborhood of the first point to a plane;

assigning respective weights to each of the second, third and fourth points that are based on projection distance; and evaluating whether the projection of the fourth point is within an orthocircle defined by a triangle having projections of the first, second and third points as vertices.

47. A method of modeling a three-dimensional (3D) surface, comprising the step of:

determining a first star of a first point in a 3D point set that at least partially describes the 3D surface, by:

projecting the first point and first near points in a neighborhood of the first point to a first plane that is estimated to be tangent to the first point;

assigning respective weights to each of the projected first near points that are based on distances between the first near points and the projected first near points; and connecting the projected first point and at least some of the projected first near points with triangles that share the projected first point as a vertex, by evaluating whether a next projected near point in a first sequence of projected first near points is closer than orthogonal to an orthocenter of a triangle having the projected first point and two of the projected first near points as vertices.

48. The method of claim 47, further comprising the step of: determining a second star of a second point in the 3D point set by:

projecting the second point and second near points in a neighborhood of the second point to a second plane that is estimated to be tangent to the second point:

assigning respective weights to each of the projected second near points that are based on distances between the second near points and the projected second near points; and connecting the projected second point and at least some of the projected second near points with triangles that share the projected second point as a vertex, by evaluating whether a next projected near point in a second sequence of projected second near points is closer than orthogonal to an orthocenter of a triangle having the projected second point and two of the projected second near points as vertices.

49. A method of modeling a three-dimensional (3D) surface, comprising the step of:

sequentially connecting a neighborhood of projected points on a plane to a first projected point on the plane by evaluating whether at least one projected point in the neighborhood of projected points is closer than orthogonal to an orthocircle defined by a triangle containing the first projected point and two projected points in the neighborhood of projected points as vertices, with the neighborhood of projected points having weights associated therewith that are each a function of a projection distance between a respective projected point in the neighborhood of projected points and a corresponding point in a 3D point set that at least partially describes the 3D surface.

50. The method of claim 49, wherein the connected neighborhood of projected points constitutes a weighted Delaunay triangulation.

51. The method of claim 49, wherein the plane is estimated to be tangent to the 3D surface.

52. A method of modeling a three-dimensional (3D) surface, comprising the steps of:

projecting a first point in a 3D point set that at least partially describes the surface and a set of points in a neighborhood of the first point to a plane that is estimated to be tangent to the surface at the first point; and creating a weighted Delaunay triangulation comprising triangles that share a projection of the first point in the plane as a vertex and include at least some of the projections of the set of points in the neighborhood of the first point as vertices that are weighted as a function of projection distance.

53. The method of claim 52, wherein the vertices are weighted as a function of projection distance squared.

54. An apparatus for modeling a three-dimensional (3D) surface, comprising:

means for determining a plurality of stars from a plurality of points $p_i$ in a 3D point set S that at least partially describes the 3D surface, by projecting the plurality of points $p_i$ onto planes $T_i$ that are each estimated to be tangent about a respective one of the plurality of points $p_i$; and means for merging the plurality of stars into a digital model of the 3D surface.

55. The apparatus of claim 54, wherein said determining means comprises means for identifying a respective subset of near points $S_i$ for each of the plurality of points $p_i$.

56. The apparatus of claim 55, wherein said determining means comprises means for projecting a plurality of points $p_j$ in each subset of near points $S_i$ to a respective estimated tangent plane $T_i$.

57. The apparatus of claim 56, wherein said determining means comprises means for determining for each of a plurality of estimated tangent planes, $T_i$, a star of the projection of a respective point $p_i$ onto the estimated tangent plane $T_i$.

58. The apparatus of claim 57, wherein the star of the projection of a respective point $p_i$ onto the estimated tangent plane $T_i$ constitutes a two-dimensional (2D) weighted Delaunay triangulation.

59. An apparatus for modeling a three-dimensional (3D) surface, comprising:

means for determining a plurality of stars from a plurality of points $p_i$ in a 3D point set S that at least partially describes the 3D surface, by projecting each of the plurality of points $p_i$ onto a respective plane; and means for merging the plurality of stars into a model of the 3D surface by eliminating edges and triangles from the plurality of stars that are in conflict and merging nonconflicting edges and triangles from the plurality of stars into a 3D surface triangulation.

60. The apparatus of claim 59, wherein said merging means comprises means for sorting triangles within the plurality of stars and removing those sorted triangles that are not in triplicate.

61. The apparatus of claim 60, wherein said merging means further comprises:

means for connecting the sorted triangles that have not been removed to define a triangulated pseudomanifold as a two-dimensional simplicial complex.

62. The apparatus of claim 61, wherein said merging means further comprises:

means for sorting edges within the plurality of stars that do not belong to any of the triangles in the triangulated pseudomanifold and removing those sorted edges that are not in duplicate; and means for adding the sorted edges that have not been removed to the triangulated pseudomanifold.

63. A computer program product that models three-dimensional (3D) surfaces and comprises a computer-readable storage medium having computer-readable program code embodied in said medium, said computer-readable program code comprising:

computer-readable program code that determines a plurality of stars from a plurality of points $p_i$ in a 3D point set S that at least partially describes the 3D surface, by projecting each of the plurality of points $p_i$ onto a respective plane; and computer-readable program code that merges the plurality of stars into a model of the 3D surface by eliminating edges and triangles from the plurality of stars that are in conflict and merging nonconflicting edges and triangles from the plurality of stars into a 3D surface triangulation.

64. The computer program product of claim 63, wherein said computer-readable program code that merges the plurality of stars comprises:

computer-readable program code that sorts triangles within the plurality of stars and removes those sorted triangles that are not in triplicate;

computer-readable program code that connects the sorted triangles that have not been removed to define a triangulated pseudomanifold as a two-dimensional simplicial complex in which edges and triangles of a star that share a vertex form a portion of an open disk;

computer-readable program code that sorts edges within the plurality of stars that do not belong to any of the triangles in the triangulated pseudomanifold and removes those sorted edges that are not in duplicate; and computer-readable program code that adds the sorted edges that have not been removed to the triangulated pseudomanifold.

65. A computer program product that models three-dimensional (3D) surfaces and comprises a computer-readable storage medium having computer-readable program code embodied in said medium, said computer-readable program code comprising:

computer-readable program code that projects a first point in a 3D point set that at least partially describes a 3D surface and a set of points in a neighborhood of the first point to a plane that is estimated to be tangent to the 3D surface at the first point; and computer-readable program code that creates a weighted Delaunay triangulation comprising triangles that share a projection of the first point in the plane as a vertex and include at least some of the projections of the set of points in the neighborhood of the first point as vertices that are weighted as a function of projection distance.

66. A method of modeling a three-dimensional (3D) surface, comprising the steps of:

projecting a first point in a 3D point set that at least partially describes the surface and a set of points in a neighborhood of the first point to a plane that is estimated to be tangent to the surface at the first point; and creating a weighted Delaunay triangulation comprising triangles that share a projection of the first point in the plane as a vertex and include at least some of the projections of the set of points in the neighborhood of the first point as vertices that are weighted as a function of projection distance, by evaluating whether or not one or more of the projections of the set of points in the neighborhood of the first point are closer than orthogonal to an orthocenter of a first triangle in the weighted Delaunay triangulation.

67. The method of claim 66, wherein each of at least a plurality the vertices is weighted as a function of projection distance squared.

68. The method of claim 66, wherein said creating step comprises evaluating a matrix containing coordinates of the vertices of the first triangle as entries therein.

69. The method of claim 68, wherein said creating step comprises computing a determinant of the matrix.

70. The method of claim 69, wherein the matrix is a 4×4 matrix; and wherein at least some of the entries in the matrix are functionally dependent on the weights associated with the vertices of the first triangle.

71. A surface modeling apparatus, comprising:

means for performing the method of any one of claims 1–53 and 66–70.

72. A computer program product readable by a machine and tangibly embodying a program of instructions executable by the machine to perform the method of any one of claims 1–53 and 66–70.

* * * * *

UNITED STATES PATENT AND TRADEMARK OFFICE
CERTIFICATE OF CORRECTION

| | | |
|---|---|---|
| PATENT NO. | : 7,023,432 B2 | Page 1 of 1 |
| APPLICATION NO. | : 10/152444 | |
| DATED | : April 4, 2006 | |
| INVENTOR(S) | : Fletcher et al. | |

It is certified that error appears in the above-identified patent and that said Letters Patent is hereby corrected as shown below:

<u>Column 33,</u>
Line 40, delete the second occurrence of "dimensional".

<u>Column 38,</u>
Lines 30-36, delete claims 71 and 72.

Signed and Sealed this

Twenty-seventh Day of June, 2006

JON W. DUDAS
*Director of the United States Patent and Trademark Office*